United States Patent
Kim

(10) Patent No.: US 12,539,913 B2
(45) Date of Patent: Feb. 3, 2026

(54) APPARATUS AND METHOD FOR CONTROLLING MOTOR

(71) Applicant: HL MANDO CORPORATION, Pyeongtaek-si (KR)

(72) Inventor: Tae Sik Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 716 days.

(21) Appl. No.: 17/856,852

(22) Filed: Jul. 1, 2022

(65) Prior Publication Data

US 2023/0012974 A1   Jan. 19, 2023

(30) Foreign Application Priority Data

Jul. 7, 2021  (KR) .................. 10-2021-0088875

(51) Int. Cl.
   *B62D 6/00*   (2006.01)
   *B62D 5/04*   (2006.01)

(52) U.S. Cl.
   CPC ........... *B62D 6/008* (2013.01); *B62D 5/0481* (2013.01)

(58) Field of Classification Search
   CPC ............................ B62D 6/008; B62D 5/0481
   See application file for complete search history.

(56) References Cited

U.S. PATENT DOCUMENTS

| | | | | |
|---|---|---|---|---|
| 2009/0294206 A1* | 12/2009 | Oblizajek | ............ | B62D 5/0472 701/41 |
| 2013/0320905 A1 | 12/2013 | Uryu | | |
| 2018/0186400 A1* | 7/2018 | Hsu | ...................... | B62D 15/029 |

FOREIGN PATENT DOCUMENTS

| | | | |
|---|---|---|---|
| DE | 69931681 T2 | 5/2007 | |
| DE | 102007011313 A1 * | 9/2008 | ........... B62D 15/029 |
| DE | 112017000192 T5 | 8/2018 | |
| DE | 102020107079 A1 | 9/2020 | |
| DE | 102021213884 A1 | 6/2022 | |
| DE | 112017000239 B4 | 8/2022 | |
| EP | 3690410 A2 * | 8/2020 | ........... B62D 5/0481 |
| JP | 2013-251936 | 12/2013 | |
| KR | 2015011144 A * | 1/2015 | |
| KR | 2019014212 A * | 2/2019 | ............... B62D 5/04 |

OTHER PUBLICATIONS

Office Action dated Mar. 18, 2024 for German Patent Application No. 102022116772.0 and its English translation provided by Google.
Office Action dated Nov. 28, 2025 for Korean Patent Application No. 10-2022-008875 and its English translation provided by Applicant's foreign counsel.

* cited by examiner

*Primary Examiner* — Jacob D Knutson
(74) *Attorney, Agent, or Firm* — WOMBLE BOND DICKINSON (US) LLP

(57) ABSTRACT

The present disclosure relates to an apparatus and a method for controlling a motor and includes: a receiver that receives vehicle vibration information or vibration request information; a determiner that determines vibration generation control information for generating a vibration having a specific magnitude and a specific phase in a steering motor including a first winding and a second winding based on the vehicle vibration information or the vibration request information; and a controller that performs control such that a vibration generation current is applied to the steering motor based on the vibration generation control information.

13 Claims, 24 Drawing Sheets

APPARATUS AND METHOD FOR CONTROLLING MOTOR

CROSS-REFERENCE TO RELATED APPLICATION

This application claims priority from Korean Patent Application No. 10-2021-0088875, filed on Jul. 7, 2021, which is hereby incorporated by reference for all purposes as if fully set forth herein.

BACKGROUND OF THE INVENTION

Field of the Invention

The present disclosure relates to an apparatus and method for controlling a motor and, more particularly, to an apparatus and a method for controlling a motor such that vibrations are generated in a steering system of a vehicle.

Description of Related Art

Generally, a steering system of a vehicle represents a device that changes a traveling direction of the vehicle by transferring a force applied to a steering wheel by a driver to vehicle wheels.

Recently, a steering system of an electric power steering (EPS) system assisting a steering force of a driver using a steering motor is applied to vehicles.

In the case of such a steering motor, if vibrations generated by driving the motor are transferred to a steering wheel, a driver's steering sense may be influenced, and particularly, in a case where tangential-direction vibrations generated by the steering motor are transferred to the steering wheel, there is a problem in that the steering of the vehicle is affected to cause a driver's mistake in steering and lower traveling stability.

SUMMARY OF THE INVENTION

The present disclosure is to provide an apparatus and a method for controlling a motor capable of reducing vibrations generated in a vehicle by performing vibration generation control for a steering motor.

In addition, the present disclosure is to provide an apparatus and a method for controlling a motor capable of operating a haptic function by performing vibration generation control for a steering motor.

According to one aspect, these embodiments can provide a motor control apparatus including: a receiver that receives vehicle vibration information or vibration request information; a determiner that determines vibration generation control information for generating a vibration having a specific magnitude and a specific phase in a steering motor including a first winding and a second winding based on the vehicle vibration information or the vibration request information; and a controller that performs control such that a current is applied to the steering motor based on the vibration generation control information.

According to another aspect, these embodiments can provide a motor control method including: receiving vehicle vibration information or vibration request information; determining vibration generation control information for generating a vibration having a specific magnitude and a specific phase in a steering motor including a first winding and a second winding based on the vehicle vibration information or the vibration request information; and performing control such that a current is applied to the steering motor based on the vibration generation control information.

The present disclosure is able to provide an apparatus and a method for controlling a motor capable of reducing vibrations generated in a vehicle by performing vibration generation control for a steering motor.

In addition, the present disclosure is able to provide an apparatus and a method for controlling a motor capable of operating a haptic function by performing vibration generation control for a steering motor.

DETAILED DESCRIPTION OF THE INVENTION

Figure 1:
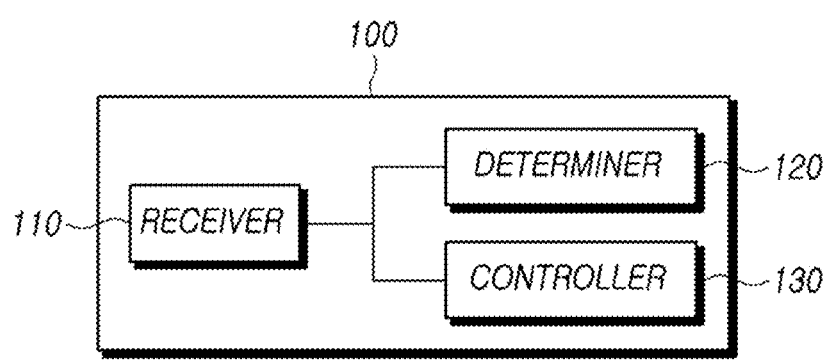
FIG. 1 is a block diagram of a motor control apparatus according to the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

In the present disclosure, a magnitude of a vibration is defined to represent an entire amplitude (p-p) of the vibration.

FIG. 1 is a block diagram of a motor control apparatus according to the present disclosure.

Referring to FIG. 1, the motor control apparatus (100) according to the present disclosure may include at least one of a receiver (110), a determiner (120), or a controller (130). The receiver (110), the determiner (120), and the controller (130) may be connected to each other.

As one example, the motor control apparatus (100) may include a receiver (110) that receives vehicle vibration information or vibration request information, the determiner (120) that determines vibration generation control information for generating a vibration having a specific magnitude and a specific phase in a steering motor including a first winding and a second winding based on the vehicle vibration information or the vibration request information, and a controller (130) that performs control such that a vibration generation current is applied to the steering motor based on the vibration generation control information.

The receiver (110) may be connected to a sensor device or another device of a vehicle and may receive information from a sensor device or another device of the vehicle. The receiver 110 may receive information at an arbitrary time point or at a predetermined period. The information received by the receiver (110) may include vehicle vibration information or vibration request information.

The vehicle vibration information represents information about a vehicle vibration generated in a vehicle. The vehicle vibration information may include a vibration generated in a steering system mounted inside a vehicle. More specifically, the vehicle vibration information may include information about a vibration generated in a steering wheel or a steering column.

The vehicle vibration may include at least one of a vibration generated in accordance with a vehicle internal factor or a vibration generated in accordance with a vehicle external factor.

For example, the vehicle vibration may include a vibration generated in accordance with a vehicle internal factor like a vibration generated in another device such as an engine of a vehicle or a vibration generated in at least one of a steering wheel or a steering column. In addition, the vehicle vibration may include a vibration generated in accordance with a vehicle external factor such as a road surface state, an obstacle, or the like.

The vehicle vibration described in the present disclosure represents a vibration generated in accordance with a factor unrelated to vibration generation control and does not include a control vibration generated in accordance with the vibration generation control.

When a destructive interference occurs between mutually-different vibrations, the vibration may be reduced. When a constructive interference occurs, the vibration may be amplified. Similarly, a vehicle vibration and a vibration generated in accordance with vibration generation control may be reduced in accordance with a destructive interference or may be amplified in accordance with a constructive interference.

The vehicle vibration information may include a detection signal detected by a sensor or information generated based on a detected signal. For example, the vehicle vibration information may include information about a magnitude and a phase of a detected vibration based on a detected signal acquired by a sensor that has detected a vehicle vibration.

As one example, the vehicle vibration information may include at least one of vibration magnitude information or vibration phase information acquired by measuring a vibration magnitude and a vibration phase of a vehicle vibration using an acceleration sensor (also referred to as a G sensor or a gravity sensor) installed inside a vehicle. In such a case, the acceleration sensor may be installed inside the motor control apparatus (100) or may be installed in at least one of a steering wheel, a steering column, or an engine device.

Depending on a situation, the vehicle vibration information may include information about a vibration measured using a displacement sensor or a speed sensor that is able to measure the vibration. Other than that, a measurement result acquired using any known technology relating to vibration measurement may be used as the vehicle vibration information.

The vibration request information represents information used for requesting generation of a vibration of a steering motor. The vibration request information may include a detection signal detected by a sensor. Alternatively, the vibration request information may include information received by another device of a vehicle.

The vibration request information may include a detection signal received from a sensor that detects a state of the inside of a vehicle or a road surface state or vehicle state information and road surface information received from another device. As one example, the vibration request information may include vehicle state information about opening/closing of doors and a trunk, whether a fuel level, a tire air pressure, and the like are equal to or lower than predetermined criteria, and the like, which is received from another device disposed inside vehicle. As another example, the vibration request information may include a detected signal relating to a vehicle state or a road surface state that is detected using an acceleration sensor, a temperature sensor, and the like.

The vibration request information may include a detection signal received from a sensor used for detecting a state of a driver or drive state information received from another device. As one example, the vibration request information may include a detection signal used for detecting that the state of a driver is a drowsy state based on an image sensor, a brainwave sensor, or the like. As another example, the vibration request information may include a detection signal used for detecting a driver's steering wheel hands-off state from a steering angle sensor, an image sensor, or the like.

The vibration request information may include a detection signal received from a sensor for detecting information about a lane in which the vehicle is traveling or lane information received from another device. As one example, the vibration request information may include a detection signal used for detecting a distance between the vehicle and a lane using a lane detection sensor, a camera, or the like.

The vibration request information may include detection information received from a sensor for detecting environment information of the vicinity of the vehicle. As one example, the vibration request information may include a detection signal used by a sensor to detect an obstacle, a speed bump, a curb, and the like in the vicinity of the vehicle.

Described as an example, a haptic function used for delivering a message to a driver or giving an alert in relation to lane keeping, drowsiness prevention, and the like may be performed inside the vehicle. In order to perform such a haptic function, the present disclosure may perform vibration generation control such that a haptic control vibration is generated in a steering motor based on received vibration request information.

In such a case, a vibration may be generated in a radial direction of the steering motor. In a case where a vibration is generated in the radial direction, differently from a tangential-direction vibration, there is no influence on steering, and thus the stability of the vehicle can be improved more than that of a case where a general radial-direction vibration is generated.

In order to maximize a vibration, a vibration may be generated such that a period of the generated vibration coincides with a natural period of one of the steering wheel or the steering column. In such a case, a constructive interference between a vehicle vibration and a vibration generated in accordance with vibration generation control may occur, and, in a case where this is used in a haptic function, a vibration stronger than a vibration generated using a vibration generation current can be transferred, and thus vibration generation efficiency can be improved.

Depending on situations, the receiver (110) may receive at least one of vehicle speed information or steering assist information. As one example, the receiver (110) may receive vehicle speed information of the vehicle from a vehicle speed sensor or the like. The receiver (110) may receive steering assist information used for assisting steering of the vehicle from at least one of a steering torque sensor, a steering angle sensor, or a vehicle speed sensor.

Specific details about such vehicle speed information will be described in detail with reference to FIG. 22 below, and specific details about the steering assist information will be described in detail with reference to FIGS. 10 and 11 below.

The determiner (120) may be connected at least one of the receiver (110) or the controller (130). The determiner (120) may determine control information based on a signal or information received by the receiver (110) and may provide the control information for the controller (130).

As one example, the determiner (120) may determine vibration generation control information used for generating a control vibration having a specific magnitude and a specific phase based on the vehicle vibration information or the vibration request information.

Here, the control vibration represents a vibration generated in accordance with vibration generation control according to the present disclosure. The control vibration may include a vibration generated by applying a vibration generation current to the steering motor in accordance with the vibration generation control. However, the control vibration does not necessarily represent only a vibration generated in the steering motor. A vibration generated in the steering motor in accordance with the vibration generation control may be transferred to the steering wheel and the steering column. In such a case, the control vibration may include a vibration generated in accordance with transfer of a vibration generated in the steering motor in accordance with the vibration generation control to at least one of the steering wheel or the steering column.

The determiner (120) may determine vibration generation control information based on the vehicle vibration information. Here, the vehicle vibration information may include at least one of vibration magnitude information or vibration phase information about a vehicle vibration.

As one example, the determiner (120) may determine vibration generation control information used for generating a control vibration having a magnitude corresponding to vibration magnitude information based on the vibration magnitude information about a vehicle vibration.

In such a case, the magnitude of the control vibration generated in accordance with vibration generation control may be determined such that it is not larger than the magnitude of the vehicle vibration. Alternatively, the magnitude of a control vibration generated in accordance with the vibration generation control may be determined such that it is the same as the magnitude of the vehicle vibration.

In such a case, if a constructive interference occurs between the vehicle vibration and the control vibration, the vehicle vibration can be reduced within a generation range of the vehicle vibration.

As another example, the determiner (120) may determine vibration generation control information for generating a vibration having a phase opposite to a phase corresponding to the vibration phase information based on the vibration phase information about the vehicle vibration.

The determiner (120) may determine vibration generation control information based on table information stored in advance. The table information may include information about at least one or more tables.

The table information may include information about an amount of current to be applied to the steering motor in accordance with values of the vibration magnitude and the vibration phase. As one example, the table information may be configured in the form of a table in which amounts of current to be applied to the steering motor according to values of the vibration magnitude and the vibration phase are stored using each vibration magnitude and each vibration phase as different indices.

Described using a more specific example, the table information may be configured in a form in which the vibration magnitude is set as a first index, the vibration phase is set as a second index, and the amount of current is stored in each cell.

In such a case, the determiner (120) may search the first index of the table information for a value corresponding to the vibration magnitude included in the vibration magnitude information from, search the second index of the table information for a value corresponding to a phase opposite to the value of the vibration phase included in the vibration phase information and search the table information for an amount of current corresponding to a search position. After that, vibration generation control information may be determined based on the retrieved amount of current.

Hereinafter, by using table information represented in Table 1 as an example, a search for an amount of current based on the vehicle vibration information and a process of determining vibration generation control information will be described.

TABLE 1

|  |  | First Index | | | | | | | |
|---|---|---|---|---|---|---|---|---|---|
|  |  | 20 | 21 | 22 | 23 | 24 | 25 | 25 | 27 |
| Second Index | 0° | 0.24 | 0.25 | 0.26 | 0.27 | 0.28 | 0.29 | 0.30 | 0.31 |
| Second Index | 45° | 0.30 | 0.31 | 0.32 | 0.33 | 0.34 | 0.35 | 0.36 | 0.37 |
| Second Index | 90° | 0.36 | 0.37 | 0.38 | 0.39 | 0.4 | 0.41 | 0.42 | 0.43 |
| Second Index | 135° | 0.42 | 0.43 | 0.44 | 0.45 | 0.46 | 0.47 | 0.48 | 0.49 |
| Second Index | 180° | 0.48 | 0.49 | 0.5 | 0.51 | 0.52 | 0.53 | 0.54 | 0.55 |
| Second Index | 225° | 0.54 | 0.55 | 0.56 | 0.57 | 0.58 | 0.59 | 0.6 | 0.61 |
| Second Index | 270° | 0.6 | 0.61 | 0.62 | 0.63 | 0.64 | 0.65 | 0.66 | 0.67 |
| Second Index | 315° | 0.66 | 0.67 | 0.68 | 0.69 | 0.7 | 0.71 | 0.72 | 0.73 |

[Table 1] represents a table in which an amount of current for generating a vibration corresponding to a vehicle vibration is stored in each cell using a vibration magnitude as a first index and using a vibration phase as a second index.

Here, a case where the unit of the first index (a vibration magnitude) is um, the unit of the second index (a vibration phase) is °, and the unit of the amount of current stored in each cell is mA is illustrated.

For example, in a case where a vehicle vibration is detected by an acceleration sensor to have a vibration magnitude of 24 um and a vibration phase of 45°, the receiver (110) may receive vehicle vibration information in which vibration magnitude information is 24 um and vibration phase information of 45°.

Thereafter, the determiner (120) may retrieve an amount of current of 0.34 mA by searching for a column having 24 in the first index of the table and a row having 45° in the second index based on the vehicle vibration information. In such a case, if a current having an amount of current of 0.34 mA is applied to the steering motor, a vibration having the same magnitude and the same phase as those of a vehicle vibration may be generated in accordance with vibration generation control.

On the other hand, the determiner (120) may determine information about a vibration having a phase opposite to that of the retrieved vibration for reducing the vehicle vibration.

For example, in a case where the vibration magnitude of a vehicle vibration is 24 um, and the vibration phase is 45°, by searching for a column having 24 in the first index of the table and a row corresponding to 225° that is a phase opposite to the vibration phase 45° of the vehicle vibration in the second index, an amount of current of 0.58 mA may be retrieved and determined.

Thereafter, if a current having an amount of current of 0.58 mA is applied to the steering motor, a vibration having the same magnitude as the vehicle vibration and an opposite phase may be generated.

As above, the determiner (120) may determine vibration generation control information such that a vibration corresponding to a phase opposite to that of the vehicle vibration is able to be generated based on the vibration magnitude information, the vibration phase information, and the table information.

In such a case, the vehicle vibration can be reduced owing to a destructive interference between a vehicle vibration and a control vibration generated in accordance with the vibration generation control. A degree of reduction of the vehicle vibration may be adjusted by controlling the magnitude of a control vibration generated in accordance with the vibration generation control.

The determiner (120) may determine vibration generation control information based on vibration request information. Here, the vibration request information may include information generated based on at least one of information about an internal state of the vehicle and a road surface state, information about a driver's state, or information about an environment of the vicinity of the vehicle.

As one example, the determiner (120) may determine the vibration generation control information such that a vibration having a specific magnitude and a specific phase is generated based on the vibration request information.

For example, the determiner (120) may determine which of the information about an internal state of the vehicle and a road surface state, the information about a driver's state, or the information about an environment of the vicinity of the vehicle is included in the vibration request information. Thereafter, the vibration generation control information may be determined such that a vibration having a magnitude and a phase that are different in accordance with details of the included information is generated.

As another example, the determiner (120) may determine vibration generation control information for generating a vibration at a period coinciding with a natural period of one of the steering wheel or the steering column. In such a case, a vibration stronger than a vibration generated in accordance with a vibration generation current can be transferred, and thus haptic vibration generation control can be performed using the current more efficiently.

Specific details of a configuration that realizes a haptic function by determining vibration generation control information about a vibration having a specific magnitude and a specific phase and vibration generation control information of a period coinciding with the natural period of one of the steering wheel and the steering column based on the vibration request information will be described below in more detail with reference to FIGS. 5 to 9.

Depending on situations, the determiner (120) may determine a vehicle speed of the vehicle based on the vehicle speed information and determine vibration generation control information in accordance with a result of the determination.

As one example, in a case where a vehicle speed is equal to or lower than a reference vehicle speed set in advance as a result of determination of the vehicle speed information, the determiner (120) may determine vibration generation control information based on the vehicle vibration information.

Specific details relating to the configuration for determining vibration generation control information based on such vehicle speed information will be described below in more detail with reference to FIG. 22.

The determiner (120) may determine at least one of steering assist control information or vibration assist control information. As one example, the determiner (120) may determine steering assist control information about a steering assist current supplied to the steering motor based on the steering assist information.

In such a case, the determiner (120) may determine such vibration assist control information about a vibration assist current that the amount of the steering assist current is superimposed on the amount of the vibration generation current based on the vibration generation control information and the steering assist control information.

Specific details relating to a configuration for determining such steering assist control information and vibration assist control information will be described below in more detail with reference to FIGS. 10 and 11.

The controller (130) may be connected to at least one of the receiver (110) or the determiner (120). The controller (130) may perform control such that a current is applied to the steering motor based on at least one of the information received by the receiver (110) or the control information determined by the determiner (120).

As one example, the controller (130) may perform control such that a vibration generation current for generating a vibration is applied based on the vibration generation control information determined by the determiner (120). In other words, the controller (130) may perform such vibration generation control that a vibration generation current is applied based on the vibration generation control information.

Here, the steering motor may be a dual wound motor (DWM) that includes a first winding and a second winding. In such a case, the controller (130) may perform control such that a current is applied to each of the first winding and the second winding of the steering motor by repeating on and off. The controller (130) may perform control such that a current is applied to each of the first winding and the second winding of the steering motor at a vibration period set in advance.

As described above, in a case where the steering motor is a dual wound motor, the controller (130) may perform vibration generation control such that a vibration in a direction perpendicular to a rotation shaft of the steering motor, in other words, a radial direction is generated.

For example, by performing control such that a current is applied to each of the first winding and the second winding of the steering motor at a vibration period set in advance by repeating on and off, vibration generation control of the motor radial direction can be performed.

On the other hand, in a case where a vibration is generated in the tangential direction of the steering motor, such a vibration in the rotation direction may change the steering of the vehicle. A steering change according to such vibration generation may cause a vehicle behavior to be unstable and cause a driver's steering error as well.

However, in a case where a vibration is generated in the radial direction of the steering motor, such a vibration in the radial direction has no influence on steering of the vehicle. Thus, in a case where a haptic function is performed by generating a vibration in the radial direction, the stability of the vehicle can be improved.

In relation to such a winding arrangement structure of the steering motor, specific details relating to the configuration for performing vibration generation control for the radial direction will be described in more detail with reference to FIGS. 12 to 20.

The controller (130) may perform reduction vibration generation control used for generating a vibration for reducing a vehicle vibration based on the vibration generation control information. In such a case, the vibration generation control information may include information that is determined based on the vehicle vibration information. Here, the vehicle vibration information may include at least one of vibration magnitude information or vibration phase information about a vehicle vibration.

As one example, the controller (130) may perform vibration generation control such that a vibration having a magnitude corresponding to the vibration magnitude information is generated based on the vibration generation control information.

As another example, the controller (130) may perform vibration generation control such that a vibration having a phase corresponding to the vibration phase information is generated based on the vibration generation control information. Alternatively, vibration generation control may be performed such that a vibration having a phase opposite to a phase corresponding to the vibration phase information is generated.

As another example, the controller (130) may perform vibration generation control such that a vibration having the same magnitude as a magnitude corresponding to the vibration magnitude information and having a phase opposite to a phase corresponding to the vibration phase information is generated based on the vibration generation control information.

The controller (130) may perform vibration generation control based on vibration generation control information determined using table information stored in advance. Here, the table information may include information about amount of current to be applied to the steering motor in accordance with values of a vibration magnitude and a vibration phase.

Described using a more specific example, the table information may be configured in a form in which an amount of current is stored in each cell by using a vibration magnitude as a first index and using a vibration phase as a second index.

In such a case, the determiner (120) may search the first index of the table information for a value corresponding to the vibration magnitude included in the vibration magnitude information from, search the second index of the table information for a value corresponding to a phase opposite to the value of the vibration phase included in the vibration phase information and search the table information for an amount of current corresponding to a search position. After that, vibration generation control information may be determined based on the retrieved amount of current.

As described above, according to the present disclosure, vibration generation control can be performed such that a vibration having a phase opposite to that of the vehicle vibration is generated. In such a case, a destructive interference phenomenon between the two vibrations may occur.

As a result, the vehicle vibration can be reduced in accordance with a control vibration generated in accordance with the vibration generation control. A degree with which the vehicle vibration is reduced may be adjusted by controlling a magnitude of a control vibration generated in accordance with the vibration generation control.

The controller (130) may perform haptic vibration generation control for generating a haptic vibration based on the vibration generation control information. At this time, the vibration generation control information may include information that is determined based on the vibration request information.

Here, the vibration request information may include information generated based on at least one of information about an internal state of the vehicle and a road surface state, information about a driver's state, or information about an environment of the vicinity of the vehicle.

For example, the controller (130) may determine which of the information about an internal state of the vehicle and a road surface state, the information about a driver's state, or the information about an environment of the vicinity of the vehicle is included in the vibration generation control information and perform control such that a vibration generation current for generating a vibration having a different magnitude and a different phase according to the included information is applied.

Described using a more specific example, a lane detection signal, which is acquired by a lane detection sensor, detecting whether or not a distance between the vehicle and a lane is within a safety distance set in advance and a driver state detection signal, which is detected by a driver state detection device, detecting whether or not a driver's state is a drowsy state may be received by the receiver (110) with being included in the vibration request information.

In such a case, the determiner (120) may determine vibration generation control information based on vibration request information in which at least one of the lane detection signal or the driver's state detection signal is included.

After that, the controller (130) may perform control such that a vibration generation current is applied based on the vibration generation control information. Through such a process, a control vibration generated in accordance with the vibration generation control is transferred to the steering wheel, and a haptic function can be performed.

On the other hand, the controller (130) may perform control such that a vibration generation current is applied to the steering motor at a period coinciding with a natural period of one of the steering wheel or the steering column set in advance. In such a case, information about natural periods of the steering wheel and the steering column may be stored in a lookup table that is additionally provided.

In a case where a vibration is generated at a period coinciding with a natural period of a specific object, the amplitude may greatly increase in accordance with a resonance phenomenon of the vibration. Thus, in a case where a vibration is generated at a period coinciding with the natural period of one of the steering wheel and the steering column, haptic vibration generation control can be performed using the current more efficiently.

Specific details of the configuration for generating a vibration having a specific magnitude and a specific phase based on the vibration generation control information and the configuration for realizing a haptic function by performing control such that a vibration is generated at a period coinciding with the natural period of one of the steering wheel or the steering column will be described below in more detail with reference to FIGS. 5, 8, and 9.

Depending on situations, the controller (130) may perform control such that a steering assist current is applied to the steering motor based on the steering assist control information or may perform control such that a vibration assist current is applied to the steering motor based on the vibration assist control information.

More specific details relating to the configuration for performing control such that such a steering assist current and a vibration assist current are applied will be described below with reference to FIGS. 10 and 11.

Figure 2:
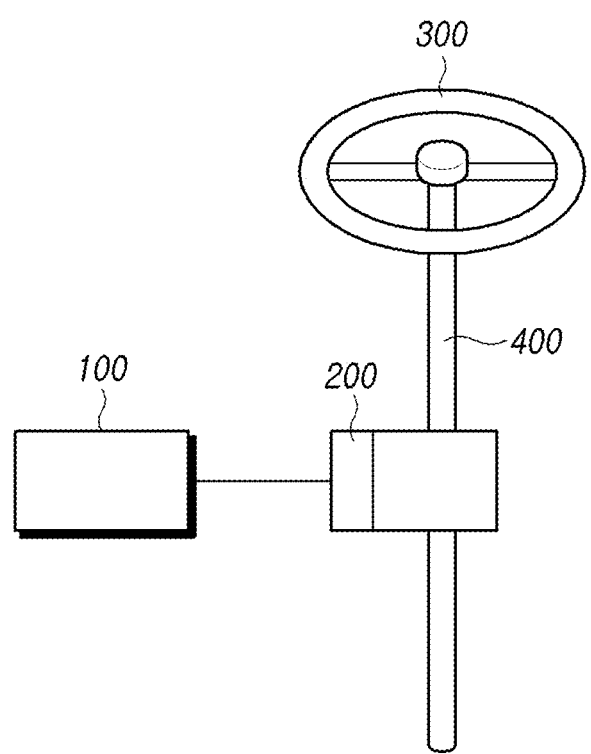
FIG. 2 is a diagram illustrating an example of a configuration of a steering system including a motor control apparatus according to an embodiment.

FIG. 2 is a diagram illustrating an example of the configuration of a steering system including the motor control apparatus (100) according to an embodiment.

Referring to FIG. 2, the steering system according to one embodiment may include a motor control apparatus (100), a steering motor (200), and at least one of a steering wheel (300) or a steering column (400). The motor control apparatus (100), the steering motor (200), the steering wheel (300), and the steering column (400) may be connected to each other.

As one example, the motor control apparatus (100) may be connected to the steering motor (200), the steering wheel (300), and the steering column (400). The motor control apparatus (100) may perform control such that a vibration generation current is applied to the steering motor (200). A sensor may be mounted inside the motor control apparatus (100). The motor control apparatus (100) may measure a vibration of at least one of the steering wheel (300) or the steering column (400) using the sensor mounted in the motor control apparatus (100).

The sensor may include at least one of an acceleration sensor or a displacement sensor or a speed sensor that is able to measure a vibration. The motor control apparatus (100) may receive a detection signal acquired by measuring a vibration of at least one of the steering wheel (300) or the steering column (400) using the sensor and determine vibration generation control information.

As one example, the steering motor (200) may be connected to the motor control apparatus (100) and the steering column (400). In a case where a vibration generation current is applied to the steering motor (200) in accordance with vibration generation control of the motor control apparatus (100), a vibration according to an amount of current applied to the steering motor (200) may be generated.

Here, the steering motor (200) may be a dual wound motor (DWM) that includes a first winding and a second winding. The controller (130) may perform vibration generation control such that a vibration in a direction perpendicular to a rotation shaft of the steering motor (200), in other words, a radial direction is generated.

For example, by performing control such that a current is applied to each of the first winding and the second winding of the steering motor at a vibration period set in advance by repeating on and off, vibration generation control for the radial direction may be performed.

Specific details relating to the configuration for performing vibration generation control in relation to the winding arrangement structure of such a steering motor will be described below in more detail with reference to FIGS. 12 to 20.

As one example, at least one of an acceleration sensor or a displacement sensor or a speed sensor that is able to measure a vibration may be mounted in at least one of the steering wheel (300) or the steering column (400).

In such a case, a vibration of at least one of the steering wheel (300) or the steering column (400) may be measured using the sensor. The sensor may transmit a detection signal acquired by measuring a vibration of at least one of the steering wheel (300) or the steering column (400) to the motor control apparatus (100).

Figure 3:
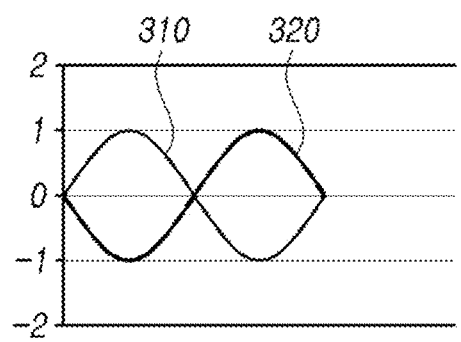
FIGS. 3 and 4 are graphs illustrating examples of vibrations, which are generated based on vehicle vibration information according to an embodiment, before and after vibration reduction as references.
Figure 4:
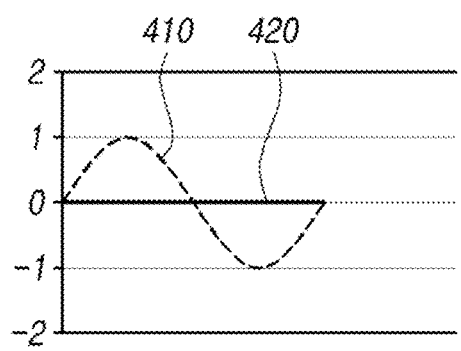

FIGS. 3 and 4 are graphs illustrating examples of vibrations, which are generated based on vehicle vibration information according to an embodiment, before and after vibration reduction as references.

Referring to FIGS. 3 and 4, the motor control apparatus (100) may perform vibration generation control based on the vehicle vibration information. Such vibration generation control is only one example and is not limited to a specific control method as long as a vibration is able to be generated in a motor.

As one example, FIG. 3 illustrates a vehicle vibration (310) before reduction and a reduction control vibration (320) generated in accordance with the vibration generation control as vibration changes graphs with respect to time.

As illustrated in the drawing, the motor control apparatus (100) may generate the reduction control vibration (320) having the same magnitude and an opposite phase with respect to those of the vehicle vibration before reduction (310). In such a case, a destructive interference of vibrations may occur between the vehicle vibration before reduction (310) and the reduction control vibration (320).

FIG. 4 illustrates a vehicle vibration before reduction (410) and a vehicle vibration after reduction (420) as vibration change graphs with respect to time in relation to a vehicle vibration.

As illustrated in the drawing, the vehicle vibration before reduction (410) represents a vibration before vibration generation control is performed in relation to a vehicle vibration, and the vehicle vibration after reduction (420) illustrates a vibration after the vibration generation control is performed as examples.

Eventually, if a destructive interference occurs between the vehicle vibration before reduction (410) and a control vibration generated in accordance with vibration generation control, like the vehicle vibration before reduction (420), consequently, the vehicle vibration can be reduced.

As described above, in a case where vibration generation control is performed such that a vibration having a phase opposite to that of the vehicle vibration is generated based on the vehicle vibration information, in accordance with a destructive interference between the vibrations, consequently, the vehicle vibration can be reduced.

Figure 5:
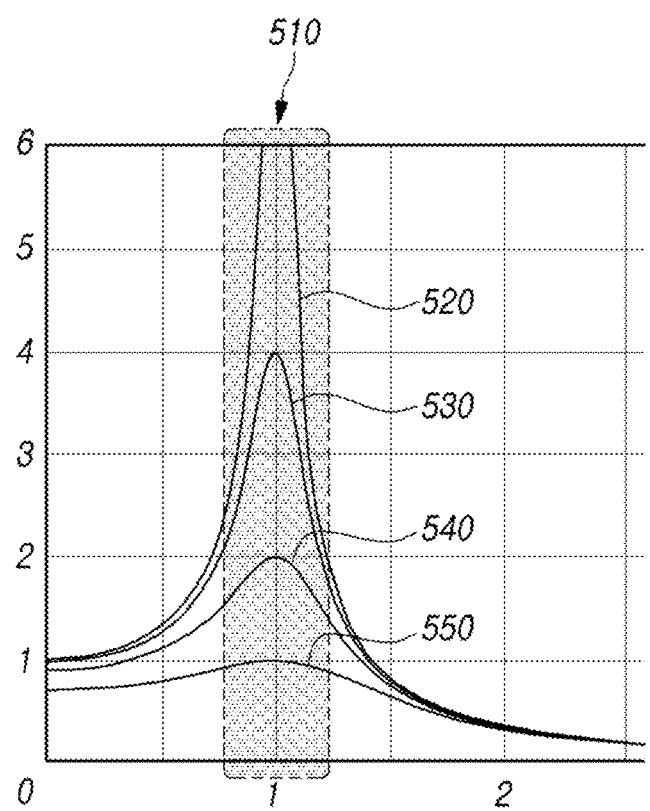
FIG. 5 is a graph illustrating natural frequencies in relation to vibrations generated based on vibration request information according to an embodiment.

FIG. 5 is a graph illustrating natural frequencies in relation to vibrations generated based on vibration request information according to an embodiment.

Referring to FIG. 5, it can be understood that vibration transmissibility becomes higher as the frequency or the period of excitation vibration becomes closer to a natural frequency or a natural period.

As one example, FIG. 5 represents four excited vibrations with different decrement ratios illustrated on a graph having the frequency ratio as its X axis and having vibration transmissibility as its Y axis in relation to natural frequencies and a frequency of a excited vibration as examples.

Here, a frequency ratio represents a value acquired by dividing exciting frequency by a natural frequency (also referred to as a resonance frequency), vibration transmissibility represents a ratio of a transmission force with which a vibration is transmitted to a total exciting force of a generated vibration, and a decrement ratio represents a loss decrement efficiency of a vibration.

More specifically, a natural frequency band (510) represents a section set in a predetermined range using a point at which the frequency ratio is 1 as a reference. Curves represented in the graph respectively represent a first decrement ratio vibration (520), a second decrement ratio vibration (530), a third decrement ratio vibration (540), and a fourth decrement ratio vibration (550) having different decrement ratios.

As illustrated in the drawing, the vibration transmissibility of each vibration increases as the frequency ratio becomes closer to 1. Here, a case where the frequency ratio is 1 represents a case where a frequency of a excited vibration and a natural frequency coincide with each other.

Described in relation to the natural frequency band (510), a vibration transmissivity of each vibration is higher in a case where the frequency ratio is included in the natural frequency band (510) than in a case where the frequency ratio is not included in the natural frequency band (510).

The vibration transmissibility of each vibration increases as the decrement ratio becomes lower. Described as an example, each vibration may be set such that the first decrement ratio=0.10, the second decrement ratio=0.25, the third decrement ratio=0.50, and the fourth decrement ratio=1.00

When the curves of respective vibrations illustrated based on such decrement ratios, it can be understood that the vibration transmissibility is larger in order of the first decrement ratio vibration (520), the second decrement ratio vibration (530), the third decrement ratio vibration (540), and the fourth decrement ratio vibration (550) that are in order of the highest to lowest decrement ratios.

To sum up, as the frequency of the excited vibration becomes closer to the natural frequency, the vibration transmissibility and the vibration magnitude of the excited vibration increase.

Also, since the frequency=1/period, as the period of the excited vibration becomes closer to the natural period, the vibration transmissibility and the vibration magnitude of the excited vibration increase as well.

Likewise, also in the relation with the natural frequency of the vehicle vibration, as the frequency or the period of the control vibration becomes closer to the natural frequency or the natural period, the vibration transmissibility and the vibration magnitude of the control vibration may increase as well.

In addition, a vibration generated in the steering column may be included in the vehicle vibration, and thus as the frequency or the period of the control vibration becomes closer to the natural frequency or the natural period of one of the steering wheel or the steering column, the vibration transmissibility and the vibration magnitude of a generated vibration may increase as well.

Figure 6:
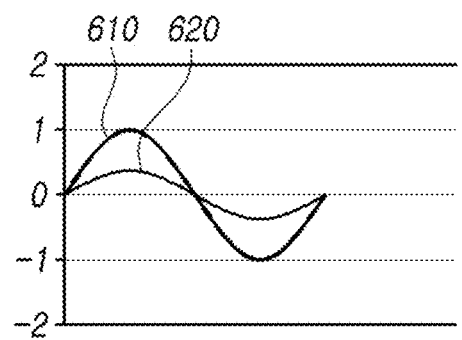
FIGS. 6 and 7 are graphs illustrating examples of vibrations generated based on vibration request information according to an embodiment.
Figure 7:
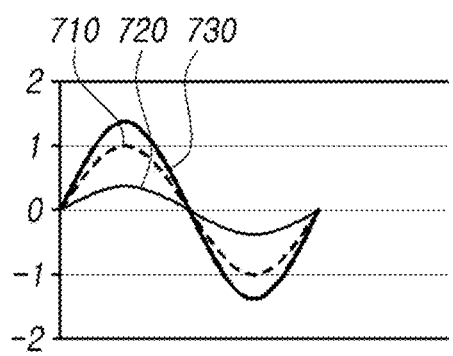

FIGS. 6 and 7 are graphs illustrating examples of vibrations generated based on vibration request information according to an embodiment.

Referring to FIGS. 6 and 7, the motor control apparatus (100) may perform vibration generation control based on the vibration request information. Such vibration generation control is only one example and is not limited to a specific control method as long as a vibration is able to be generated in a motor.

As one example, FIG. 6 illustrates a vehicle vibration before generation of haptic (610) and a first haptic control vibration (620) generated in accordance with vibration generation control as vibration change graphs with respect to time.

As illustrated in the drawing, the motor control apparatus (100) may perform control such that a first haptic control vibration (620) is generated at a period coinciding with the natural period of the vehicle vibration (610). In such a case, a constructive interference of vibrations may occur between the vehicle vibration before generation of haptic (610) and the first haptic control vibration (620).

FIG. 7 illustrates a vehicle vibration before generation of haptic (710) relating to a vehicle vibration before performance of vibration generation control, a second haptic control vibration (720) generated in accordance with vibration generation control, and a haptic constructive vibration (730) according to a constructive interference between a vehicle vibration and a haptic control vibration as vibration changes graphs with respect to time.

As illustrated in the drawing, the vehicle vibration before generation of haptic (710) represents a vibration before performance of the vibration generation control in relation to a vehicle vibration. The second haptic control vibration (720) represents a vibration generated in a case where vibration generation control is performed based on the vibration request information. Then, the haptic constructive vibration (730) causes the second haptic control vibration (720) to be generated at a period coinciding with the natural period of the vehicle vibration, and a result of a constructive interference between the vehicle vibration before generation of haptic (710) and the second haptic control vibration (720) is illustrated.

Eventually, if a constructive interference occurs between the vehicle vibration before generation of haptic (710) and the second haptic control vibration (720), consequently, similar to the haptic constructive vibration (730), the magnitude of a haptic vibration generated in accordance with vibration generation control may increase.

Described using a more specific example, the vibration magnitude of the second haptic control vibration (720) may be set to be determined as being a value acquired by multiplying the vibration magnitude of the vehicle vibration before generation of haptic (710) by 0.4.

In such a case, if the vibration magnitude of the vehicle vibration before generation of haptic (710) is measured to be 100 um, the vibration magnitude of the haptic control vibration (720) may be determined as being 100 um×0.4=40 um.

In addition, in a case where a constructive interference occurs between the vehicle vibration before generation of haptic (710) and the haptic control vibration (720), the haptic constructive vibration (730) may be determined as being 100 um×(1.0+0.4)=140 um.

Consequently, although the vibration magnitude of the second haptic control vibration (720) generated in accordance with vibration generation control of the motor control apparatus (100) is only 40 um, the haptic constructive vibration (730) having a magnitude of 140 um is generated in accordance with a constructive interference with the vehicle vibration before generation of haptic (710). In accordance with this, the efficiency of generation of a haptic vibration according to the vibration generation control can be improved.

As described above, in a case where vibration generation control is performed such that a vibration is generated at a period coinciding with the natural period of the vehicle vibration based on the vibration request information, the magnitude of the haptic vibration can be increased using a constructive interference between vibrations.

Consequently, if a haptic vibration is generated at a period coinciding with the natural period, an efficiency of generation of a haptic vibration and a current use efficiency can be improved more than in a case where a haptic vibration is generated at a period not coinciding with the natural period.

Figure 8:
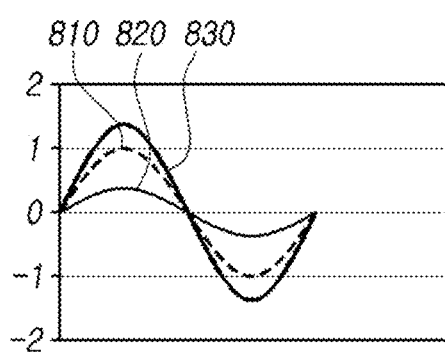
FIGS. 8 and 9 are graphs illustrating cases where vibrations generated based on details of vibration request information according to an embodiment become different as examples.
Figure 9:
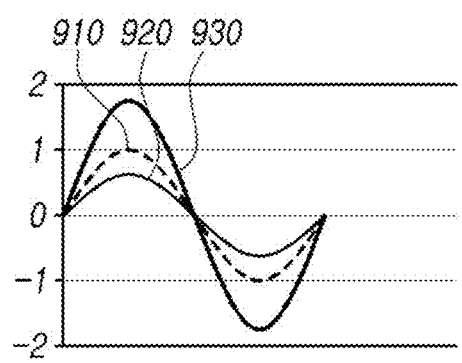

FIGS. 8 and 9 are graphs illustrating cases where vibrations generated based on details of vibration request information according to an embodiment become different as examples.

In the vibration request information, any information about a state in which a haptic function can be performed based on vehicle state information, road surface state information, driver state information, lane information, obstacle information, and the like.

For example, a vibration corresponding to a first magnitude set in advance may be generated in a case where details of the vibration request information includes information about a first state, and, in a case where information about a second state is included, a vibration corresponding to a second magnitude set in advance may be generated.

More specifically, for example, the first state may be set to represent a case where a distance between the vehicle and a lane is within a safety distance set in advance, that is, a case where lane keeping is required, and the second state may be set to represent a case where a driver's state is detected to be a drowsy state.

In addition, in order to differentiate haptic vibrations in the first state and the second state, haptic control vibrations may be set to be determined using different methods in determining vibration generation control information in the states.

Hereinafter, a configuration in which, by performing vibration generation control based on vibration request information in the first state and the second state, haptic vibrations to be generated are different in the states will be described with reference to FIGS. 8 and 9 as an example.

As one example, FIG. 8 illustrates a first state vehicle vibration (810) relating to a vehicle vibration in the first state, a first state haptic control vibration (820) generated in accordance with vibration generation control in the first state, and a first state haptic constructive vibration (830) according to a constructive interference between the vehicle vibration in the first state and the haptic control vibration as vibration change graphs with respect to time.

As illustrated in the drawing, a haptic control vibration may be generated at a period coinciding with a natural period of the first state vehicle vibration (810) in the first state. In such a case, a constructive interference of vibrations may occur between the first state vehicle vibration (810) and the second state haptic control vibration (820).

Eventually, if a constructive interference occurs between the first state vehicle vibration (810) and the first state haptic control vibration (820), consequently, as the first state haptic constructive vibration (830), the magnitude of the haptic vibration generated in accordance with vibration generation control may increase.

In such a case, in order to differentiate haptic vibrations in the first state and the second state, determination methods may be set such that the first state haptic control vibration (820) and a second state haptic control vibration (920) to be described below with reference to FIG. 9 may be determined to have different magnitudes.

More specifically, the vibration magnitude of the first state haptic control vibration (820) may be set to be determined to be a value acquired by multiplying the vibration magnitude of the first state vehicle vibration (810) by 0.4.

In such a case, if the vibration magnitude of the first state vehicle vibration (810) is measured to be 100 um, the vibration magnitude of the first state haptic control vibration (820) may be determined to be 100 um×0.4=40 um, and the vibration magnitude of the first state haptic constructive vibration (830) may be determined to be 100 um×(1.0+0.4) =140 um in accordance with a constructive interference.

Eventually, in a case where vibration generation control is performed based on vibration request information received in the first state, a driver may receive a vibration having a magnitude of 140 um corresponding to the first state haptic constructive vibration (830).

As another example, FIG. 9 illustrates a second state vehicle vibration (910) relating to a vehicle vibration before vibration generation control is performed in the second state, a second state haptic control vibration (920) generated in accordance with vibration generation control in the second state, and a second state haptic constructive vibration (930) according to a constructive interference between the vehicle vibration in the second state and the haptic control vibration as vibration change graphs with respect to time.

As illustrated in the drawing, the motor control apparatus (100) may generate a haptic control vibration at a period coinciding with a natural period of the second state vehicle vibration (910) in the second state. In such a case, a constructive interference of vibrations may occur between the second state vehicle vibration (640) and the second state haptic control vibration (920).

Eventually, if a constructive interference occurs between the second state vehicle vibration (910) and the second state haptic control vibration (920), consequently, as the second state haptic constructive vibration (930), the magnitude of the haptic vibration generated in accordance with vibration generation control may increase.

In such a case, in order to differentiate haptic vibrations in the first state and the second state, determination methods may be set such that the first state haptic control vibration (820) described with reference to FIG. 8 described above and the second state haptic control vibration (920) may be determined to have different magnitudes.

Described using a more specific example, the vibration magnitude of the second state haptic control vibration (920) may be set to be determined to be a value acquired by multiplying the vibration magnitude of the second state vehicle vibration (910) by 0.7.

In such a case, if the vibration magnitude of the second state vehicle vibration (910) is measured to be 100 um, the vibration magnitude of the second state haptic control vibration (920) may be determined to be 100 um×0.7=70 um, and the vibration magnitude of the second state haptic constructive vibration (930) may be determined to be 100 um×(1.0+ 0.7)=170 um in accordance with a constructive interference.

Eventually, in a case where vibration generation control is performed based on vibration request information received in the second state, a driver may receive a vibration having a magnitude of 170 um corresponding to the second state haptic constructive vibration (930).

As described in the embodiment described above, if vibration generation control is performed in the first state and the second state, a drive can receive vibrations having different magnitudes of 140 um and 170 um.

In this way, by causing different haptic vibrations to be generated in accordance with states requiring haptic functions in a vehicle, more various haptic functions can be delivered.

Alternatively, even if the type of state requiring a haptic function in a vehicle is the same, by classifying haptic vibrations in accordance specific details of each state such as classifying detected states into degrees of urgency or the like, different vibrations may be generated.

A configuration for generating haptic vibrations with being classified into vehicle states is not necessarily limited to classification into vibration magnitudes. For example, any classification method using a known technology for generating haptic vibrations such as a method of differentiating vibration generation periods or a method of differentiating generation patterns of vibrations may be used.

Figure 10:
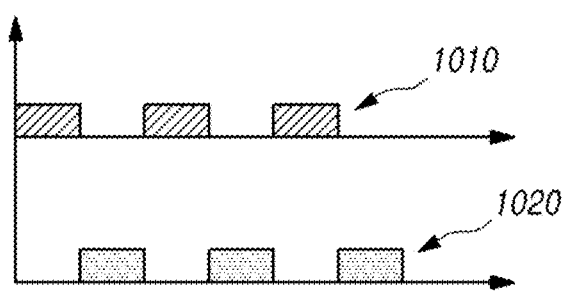
FIGS. 10 and 11 are graphs illustrating cases where steering assist control and vibration assist control are performed based on steering assist information according to an embodiment in a comparative manner.
Figure 11:
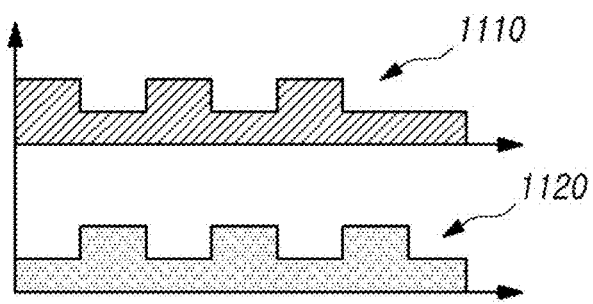

FIGS. 10 and 11 are graphs illustrating cases where steering assist control and vibration assist control are performed based on steering assist information according to an embodiment in a comparative manner.

The motor control apparatus (100) may determine steering assist control information and vibration assist control information based on received steering assist information and perform vibration assist control based on the determined control information.

Hereinafter, a specific process of determining such vibration assist control information and performing vibration assist control will be described.

As one example, the receiver (110) may receive steering assist information. Here, the steering assist information represents information that is required for assisting a driver' steering. For example, the steering assist information may include detection signals received from a steering torque sensor, a steering angle sensor, a vehicle speed sensor, and the like.

However, such steering assist information is not necessarily limited to a signal received from one of the steering torque sensor, the steering angle sensor, or the vehicle speed sensor and may also include information of other details received from another device as long as the information relates to steering assist of the vehicle.

As one example, the determiner (120) may determine steering assist control information based on the steering assist information. In addition, the determiner (120) may determine vibration assist control information based on the vibration generation control information and the steering assist control information.

The steering assist control information represents information about control performed by the motor control apparatus (100) for assisting steering of the vehicle. As one example, the steering assist control information may include information about a steering assist current supplied to the steering motor for steering assist.

The vibration assist control information represents control information used for the motor control apparatus (100) to perform steering assist control and vibration generation control. As one example, the vibration assist control information may include at least one of vibration generation control information about a vibration generation current or steering assist control information about a steering assist current.

In addition to this, the vibration assist control information may include information about a vibration assist current causing an amount of the steering assist current to be superimposed on the amount of the vibration generation current based on the vibration generation control information and the steering assist control information.

As one example, the controller (130) may perform steering assist control based on the steering assist control information. In addition, the controller (130) may perform vibration assist control based on the vibration assist control information.

Here, the steering assist control may include performing of control such that a steering assist current is applied to the steering motor. In addition, the vibration assist control may include performing of control such that at least one of the steering assist current, the vibration generation current, and the vibration assist current to the steering motor.

In such a case, vibration assist control performed based on the vibration generation current may include performing of control such that a vibration generation current is applied to each of the first winding and the second winding of the steering motor by repeating on and off. Depending on situations, the vibration assist control may include performing of control such that a current is applied to the first winding and the second winding at a vibration period set in advance.

Hereinafter, a configuration for performing vibration assist control will be described as an example with reference to FIGS. 10 and 11 for each of a case where steering assist does not occur and a case where steering assist occurs.

As one example, FIG. 10 illustrates a first current (1010) applied to the first winding of the steering motor and a second current (1020) applied to the second winding using motor current application amount graphs with respect to time for illustrating the case where steering assist does not occur.

Here, vibration assist control may include performing of control such that a vibration assist current not generating steering assist is applied to the steering motor.

In such a case, in the vibration assist control, steering assist is controlled to be caused not to occur by setting an amount of a steering assist current applied to the steering motor to 0, and the control may be performed only by applying a vibration generation current to the steering motor.

As illustrated in the drawing, the vibration assist control may be performed such that the first current (1010) and the second current (1020) are respectively applied to the first winding and the second winding of the steering motor.

In such a case, as each of the first current (1010) and the second current (1020), a current including a vibration generation current not including a steering assist current may be applied.

For example, an amount of the vibration generation current may be determined to be 30 mA, an amount of the steering assist current may be determined to be 0 mA, and a generation period of each current may be determined to be 50 Hz. In such a case, an amount of each of a third current (1110) and a fourth current (1120) to be described below with reference to FIG. 11 may be set to a value determined as 30 mA+0 mA=30 mA, and each current may be set to be applied at a period of 50 Hz.

In accordance with this, in a case where a current is generated by respectively applying the first current (1010) and the second current (1020) set to have an amount of current of 30 mA and a period of 50 Hz and repeat on and off to the first winding and the second winding of the steering motor, only vibration generation control may be caused to be performed without performing steering assist control.

As another example, FIG. 11 are graphs illustrates motor current application amounts with respect to time in performing vibration assist control as a third current (1110) and a fourth current (1120) for describing a case where steering assist occurs as an example.

Here, vibration assist control may include performing of control such that a vibration assist current generating steering assist is applied to the steering motor.

In such a case, the vibration assist control may include performing of control such that all the information about a steering assist current and a vibration generation current are generated.

As illustrated in the drawing, the vibration assist control may be performed such that the third current (1110) and the fourth current (1120) are respectively applied to the first winding and the second winding of the steering motor.

In such a case, both the vibration generation current and the steering assist current may be set to be included in the third current (1110) and the fourth current (1120). More specifically, a current acquired by superimposing an amount of the steering assist current on the amount of the vibration generation current may be set to be applied.

For example, an amount of the vibration generation current may be determined to be 30 mA, an amount of the steering assist current may be determined to be 100 mA, and a generation period of each current may be determined to be 50 Hz. In such a case, an amount of each of the third current (1110) and the fourth current (1120) may be set to a value determined as 30 mA+100 mA=130 mA, and each current may be set to be applied at a period of 50 Hz.

In accordance with this, in a case where a current is generated by respectively applying the third current (1110) and the fourth current (1120) set to have an amount of current of 130 mA and a period of 50 Hz and repeat on and off to the first winding and the second winding of the steering motor, both the steering assist control and the vibration generation control may be caused to be performed.

Hereinafter, a specific configuration for generating a vibration in ae steering motor in relation to vibration generation control according to an embodiment will be described with reference to FIGS. 12 to 20.

Figure 12:
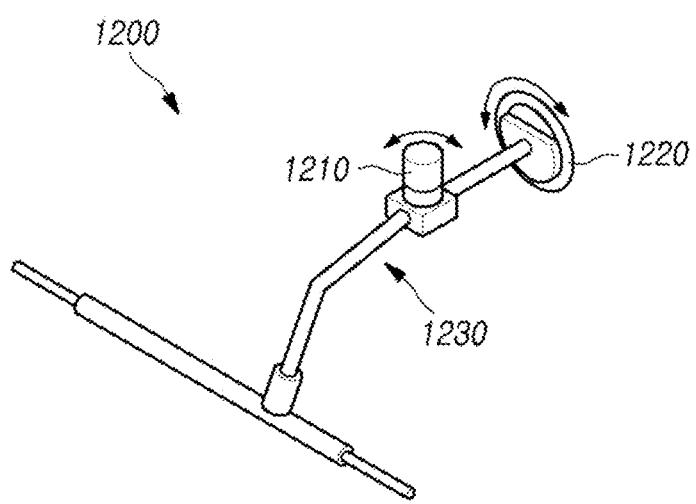
FIGS. 12 and 13 are diagrams illustrating steering systems in relation to vibration generation control according to an embodiment as examples.
Figure 13:
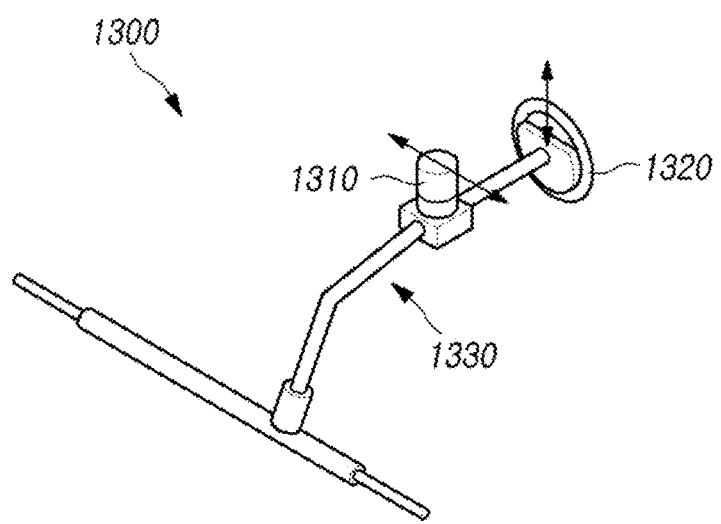

FIGS. 12 and 13 are diagrams illustrating steering systems in relation to vibration generation control according to an embodiment as examples.

Referring to FIGS. 12 and 13, the steering apparatus may generate a force in a predetermined direction by applying a current to a steering motor, and the force generated in the steering motor may be transferred to at least one of a steering column or a steering wheel. The force generated in the steering motor may be transferred to at least one of the steering wheel or the steering column in the form of a vibration in a predetermined direction.

As one example, referring to FIG. 12, a first steering system (1200) may generate a force in a tangential direction by applying a current to a first steering motor (1210), and the rotation direction (tangential direction) force generated in the first steering motor (1210) may be transferred to at least one of a first steering wheel (1220) and a first steering column (1230) in the form of a tangential-direction vibration.

Here, the first steering motor (1210) may be one of a single wound motor including one winding or a dual wound motor including a first winding and a second winding. In such a case, by applying a current in a winding of the first steering motor (1210), a tangential-direction vibration may be generated.

As one example, referring to FIG. 13, a second steering system (1300) may generate a force in a radial direction by applying a current to a second steering motor (1310), and the radial-direction force generated in the second steering motor (1310) may be transferred to at least one of a second steering wheel (1320) and a second steering column (1330) in the form of a radial-direction vibration.

Here, the second steering motor (1310) may be a dual wound motor including a first winding and a second winding. In such a case, by applying a current to each of the first winding and the second winding of the second steering motor (1310) by repeating on and off, a radial-direction vibration may be generated.

Figure 14:
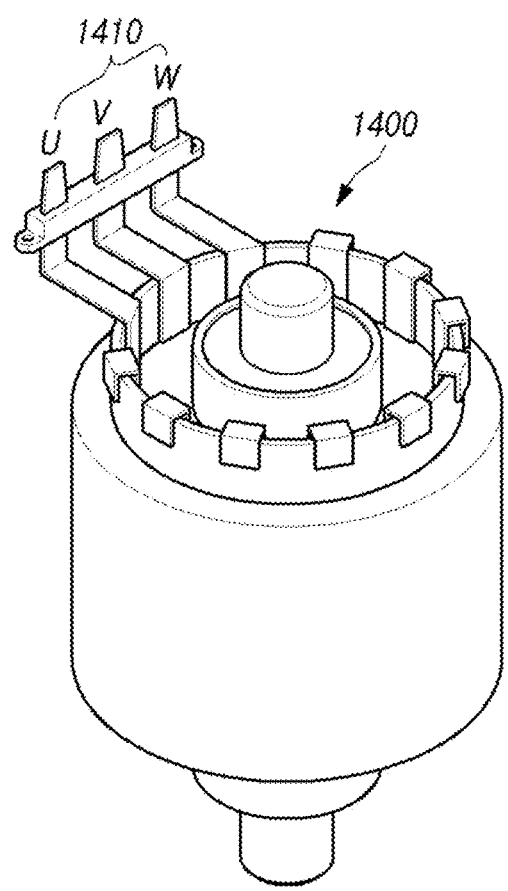
FIGS. 14 and 15 are diagrams illustrating structures of motors in relation to vibration generation control according to an embodiment as examples.
Figure 15:
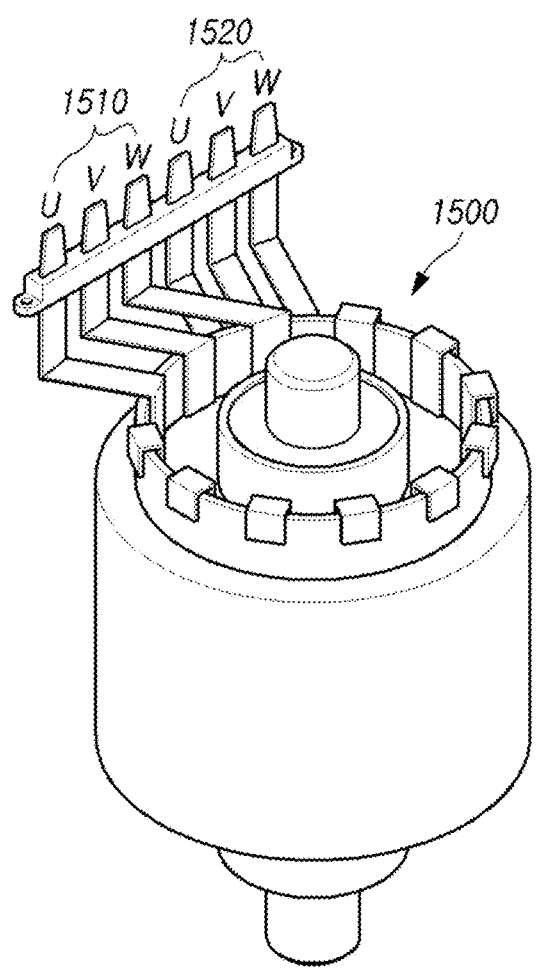

FIGS. 14 and 15 are diagrams illustrating structures of motors in relation to vibration generation control according to an embodiment as examples. Here, each of the motors may be a three-phase motor in which coils U, V, and W of three phases are arranged at predetermined intervals. In other words, hereinafter, U, V, and W illustrated in FIGS. 14 to 20 represent coils having mutually-different phases arranged in each motor.

As one example, FIG. 14 illustrates a structure of a single wound motor (1400). Here, the single wound motor (1400) may include a single winding (1410) in which coils U, V, and W of three phases are arranged at predetermined intervals.

In such a case, if a current is applied to the single wound motor (1400), a tangential direction vibration may be generated.

As another example, FIG. 15 illustrates a structure of a dual wound motor (1500). Here, the dual wound motor (1500) may include a first winding (1510) and a second winding (1520) by arranging coils U, V, and W of three phases doubly.

In such a case, if a current is applied to each of the first winding and the second winding of the dual wound motor (1500), a radial direction force may be generated.

Figure 16:
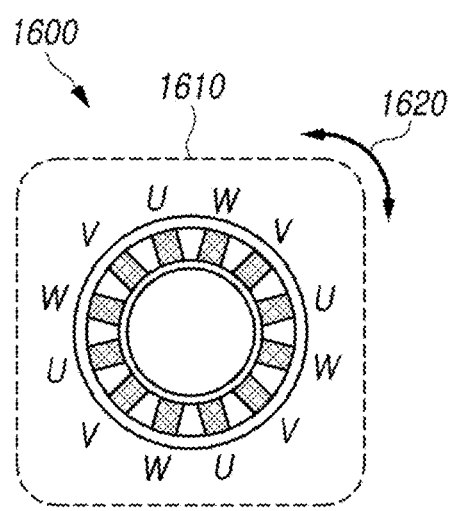
FIGS. 16 and 17 are diagrams illustrating vibration generation directions according to winding arrangement structures of motors in relation to vibration generation control according to an embodiment as examples.
Figure 17:
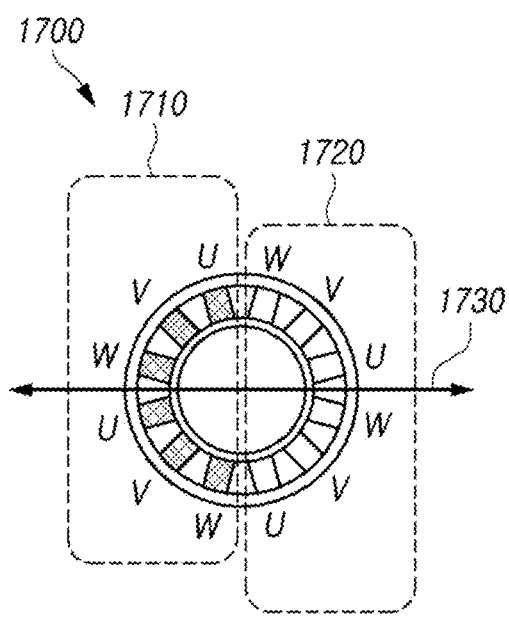

FIGS. 16 and 17 are diagrams illustrating vibration generation directions according to winding arrangement structures of motors in relation to vibration generation control according to an embodiment as examples.

In FIG. 16, parts that are slashed to be represented dark represents slots. In FIG. 17, each slot of which inside is slashed to be represented dark among the slots indicates that a first winding is arranged, and each slot of which inside is processed to be a blank to be displayed bright among the slots indicates that a second winding is arranged.

As one example, FIG. 16 illustrates a winding arrangement structure of a single wound motor (1600). Here, the single wound motor (1600) has the same structure as the single wound motor (1400) illustrated in FIG. 14. In accordance with this, the single wound motor (1600) may also include a single winding (1610) in which coils U, V, and W of three phases are arranged.

In a case where the single wound motor (1600) is operated by applying a current thereto, the single wound motor (1600) may generate a vibration in a motor rotation direction (1620) based on a winding structure of the inside the single winding (1610).

As another example, FIG. 17 illustrates a winding arrangement structure of a dual wound motor (1700). Here, the dual wound motor (1700) has the same structure as the dual wound motor (1500) illustrated in FIG. 15. In accordance with this, the dual wound motor (1700) has windings in which coils U, V, and W of three phases are arranged to be arranged doubly as well and may include a first winding (1710) and a second winding (1720).

In a case where the dual wound motor (1700) is operated by applying a current thereto, a vibration in a motor radial direction (1730) may be generated based on winding structures of the insides of the first winding (1710) and the second winding (1720) in the dual wound motor (1700).

Described more specifically, currents may be applied to the first winding (1710) and the second winding (1720) in the dual wound motor (1700) to repeat on and off, and, in such a case, on (generation) and off (stop) may be repeated in each of a force generated in the first winding (1710) and a force generated in the second winding (1720). Eventually, in the dual wound motor (1700), a vibration in the motor radial direction (1730) may be generated while movement in the direction of the first winding (1710) and movement in the direction of the second winding (1720) are repeated.

A current may be applied to each of the first winding (1710) and the second winding (1720) of the dual wound motor (1700) to repeat on and off at a vibration period set in advance. In such a case, a vibration of the motor radial direction (1730) may be generated at a predetermined period in the dual wound motor (1700).

As described above, in the case of the single wound motor (1600), in a case where a current is generated in the single winding (1610), only a vibration of the motor rotation direction (1620) is able to be generated. However, in the case of the dual wound motor (1700), in a case where a current is generated by repeating on and off for the first winding (1710) and the second winding (1720), a vibration of the motor radial direction (1730) is able to be generated.

Figure 18:
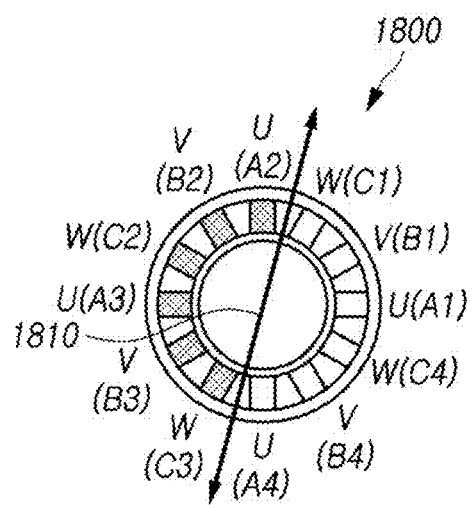
FIGS. 18 to 20 are diagrams illustrating winding arrangement structures of motors and winding weighting information according thereto in relation to vibration generation control according to an embodiment as examples.
Figure 19:
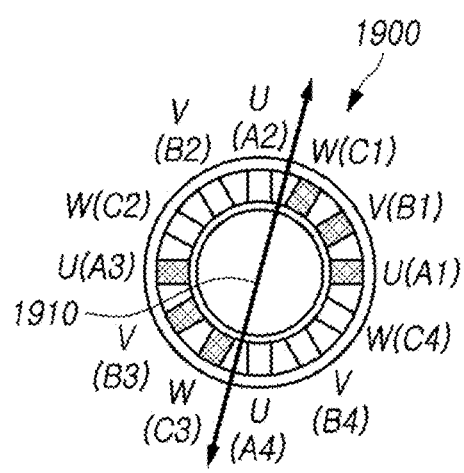
Figure 20:
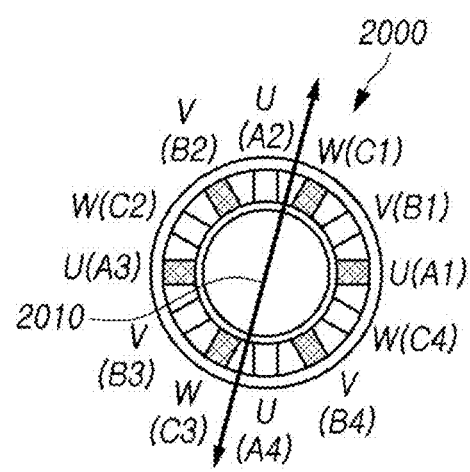

FIGS. 18 to 20 are diagrams illustrating winding arrangement structures of steering motors and winding weighting information according thereto in relation to vibration generation control according to an embodiment as examples.

Here, in a case where a current is applied to each of the first winding and the second winding of the steering motor by repeating on and off, a predetermined force may be generated in each of the first winding and the second winding. In such a case, in accordance with an arrangement structure of the first winding and the second winding, magnitudes and directions of a force generated in each of the first winding and the second winding may differ.

More specifically, after a vibration generated in each winding arrangement structure of the steering motor is determined, a vibration component of a radial direction may be extracted for each generated vibration.

After that, if extraction results of vibration components of the radial direction extracted from respective vibrations are compared with each other, magnitudes of vibrations of the radial direction generated in accordance with vibration generation control may be compared with each other for the winding arrangement structures of the steering motor.

Referring to FIGS. 18 to 20, the steering motor may have one of a first arrangement structure (1800), a second arrangement structure (1900), or a third arrangement structure (2000). However, the winding arrangement structure of the steering motor is not limited to three structures illustrated here but includes all the winding arrangement structures using any known technology.

Each of steering motors illustrated in FIGS. 18 to 20 may have 12 slots in which a winding may be arranged. In such a case, identification numbers A1, B1 C1, A2, B2, C2, A3, B3, C3, A4, B4, and C4 are set to respective slots.

In this way, the reason for representing in the form of a coil representation (a slot identification number) illustrated in FIGS. 18 to 20 is for indicating a coil representation and a slot identification number to be distinguished from each other. In other words, U, V, and W representing coils of three phases and A1, B1 C1, A2, B2, C2, A3, B3, C3, A4, B4, and C4 representing the slots of the motor are not directly associated with each other.

For example, in a case where description of the slot A1 is required, it is not necessary to give a coil representation together in the form of U(A1), and only the slot identification number A1 may be written. In this way, hereinafter, in a case where each slot is described, only the slot identification number will be written.

In FIGS. 18 to 20, each slot of which inside is slashed to be displayed dark among the slots indicates that the first winding is arranged, and each slot of which inside is processed to be a blank to be displayed bright among the slots indicates that a second winding is arranged.

As one example, FIG. 18 illustrates a steering motor in which windings are arranged using a first arrangement structure (1800). Here, the first winding may be arranged in each of six slots A2, B2, C2, A3, B3, and C3 among the 12 slots, and the second winding may be arranged in each of six slots A1, B1 C1, A4, B4, and C4.

In such a case, if a current is generated by repeating on and off for each of the first winding and the second winding, forces may be generated in the first windings in all the 6 slots A2, B2, C2, A3, B3, and C3 that are densely present on the left side of a first reference axis (1810).

In addition, forces may be generated in the second windings in all the 6 slots A1, B1, C1, A4, B4, and C4 that are densely present on the right side of the first reference axis (1810).

In a case where vibration generation control is performed by a steering motor having the first arrangement structure (1800), vibrations of the radial direction are generated in the left and right 6 slots and a mutually dense structure.

As another example, FIG. 19 illustrates a steering motor in which windings are arranged using a second arrangement structure (1900). Here, the first winding may be arranged in 6 slots A1, B1 C1, A3, B3, and C3 among the 12 slots, and the second winding may be arranged in 6 slots A2, B2, C2, A4, B4, and C4.

In such a case, if a current is generated by repeating on and off for each of the first winding and the second winding, forces may be generated in the second winding in 3 slots A2, B2, and C2, that are densely present at an upper end on the left side with reference to a second reference axis (1910), and forces may be generated in the first winding in 3 slots A3, B3, and C3 that are densely present at a lower end on the left side.

Forces may be generated in the first winding in 3 slots A1, B1, and C1 that are densely present at an upper end on the right side with reference to the second reference axis (1910), and forces may be generated in the second winding in three slots A4, B4, and C4 that are densely present at a lower end on the right side.

In a case where vibration generation control is performed by a steering motor having the second arrangement structure (1900), vibrations of the radial direction are generated in the left and right 3 slots and a mutually dense structure.

As another example, FIG. 20 illustrates a steering motor in which windings are arranged using a third arrangement structure (2000). Here, the first winding may be arranged in 6 slots A1, A3, B1, B3, C1, and C3 among the 12 slots, and the second winding may be arranged in 6 slots A2, A4, B2, B4, C2, and C4.

In such a case, if a current is generated by repeating on and off for each of the first winding and the second winding, forces may be generated in the first winding in three slots A3, B2, and C3 that are dispersedly arranged on the left side with reference to a third reference axis (2010), and forces may be generated in the second winding in three slots A2, B3, and C3 that are dispersedly arranged. Forces may be generated in the first winding in 3 slots A1, B4, and C1 that are dispersedly arranged on the right side with reference to the third reference axis (2010), and forces may be generated in the second winding in three slots A4, B1, and C4 that are dispersedly arranged.

In a case where vibration generation control is performed by a steering motor having the third arrangement structure (2000), vibrations of the radial direction are generated in the left and right 3 slots and a dispersed structure.

Here, in a case where vibration generation control is performed for steering motors having the first arrangement structure (1800), the second arrangement structure (1900), and the third arrangement structure (2000), the first vibration may be generated in the first arrangement structure (1800), the second vibration may be generated in the second arrangement structure (1900), and the third vibration may be generated in the third arrangement structure (2000).

As one example, in a case where a current is generated by repeating on and off for each of the first winding and the second winding, magnitudes of vibrations of the radial direction generated in the first winding and the second winding may differ in accordance with the winding arrangement structure of the steering motor.

When more specifically described through a comparison, vibrations of the radial direction are generated in left and right 6 slots with reference to the first reference axis (1810) in the first arrangement structure (1800), and vibrations of the radial direction are generated in left and right 3 slots with reference to the second reference axis (1910) in the second arrangement structure (1900).

In accordance with this, a magnitude of the radial direction vibration generated by the steering motor having the first arrangement structure (1800) in which the number of slots generating the radial direction vibration is more than that of the second arrangement structure may be larger than the magnitude of the radial direction vibration generated by the steering motor having the second arrangement structure (1900).

In the second arrangement structure (1900), a radial direction vibration is generated in a dispersed structure with reference to the second reference axis (1910). In the third arrangement structure (2000), a radial direction vibration is generated in a dispersed structure with reference to the third reference axis (2010).

In accordance with this, the magnitude of the radial direction vibration generated by the steering motor having the second arrangement structure (1900), which is a structure being able to generate a larger vibration by generating the radial direction vibration more densely, may be larger than the magnitude of the radial direction vibration generated by the steering motor having the third arrangement structure (2000).

In such a case, in order to generate vibrations, which are generated in accordance with vibration generation control, having a constant magnitude, it is necessary to determine magnitudes of the vibrations to be generated with the arrangement structure of the first winding and the second winding taken into account.

For this, winding weighting information may be set differently for each arrangement structure of the first winding and the second winding in the steering motor.

For example, it may be assumed that a relative magnitude of the radial direction vibration is 1.0 in the first arrangement structure (1800), a relative magnitude of the radial direction vibration is 0.8 in the second arrangement structure (1900), and a relative magnitude of the radial direction vibration is 0.5 in the third arrangement structure (2000).

In such a case, weighting information for the first arrangement structure (1800) may be set to 1.0. In addition, weighting information for the second arrangement structure (1900) may be set to 1.25, and weighting information for the third arrangement structure (2000) may be set to 2.0.

In a case where the weighting information is set as described above, although the arrangement structure of the first winding and the second winding in a steering motor is different, the magnitudes of vibrations generated in accordance with the vibration generation control can be adjusted by setting the weighting information.

Hereinafter, the motor control apparatus (100) will be briefly described again from a point of view of a method, details that are duplicates of the details described above will be omitted as necessary, but all the details may be applied to the point of view of the method.

Figure 21:
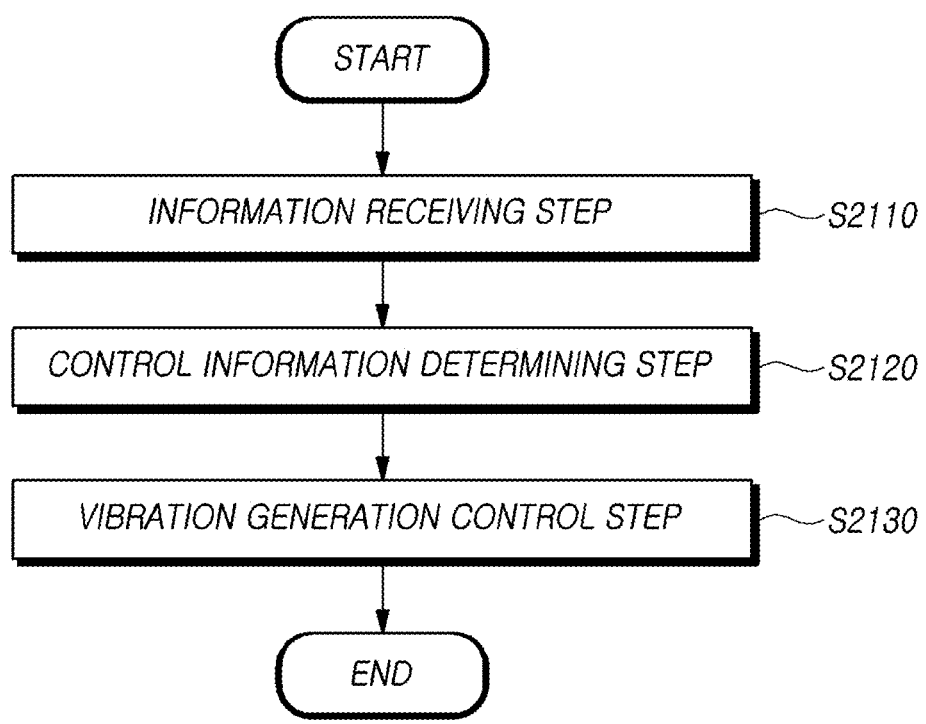
FIG. 21 is a flowchart relating to a motor control method according to the present disclosure.

FIG. 21 is a flowchart relating to a motor control method according to the present disclosure.

Referring to FIG. 21, the motor control method according to the present disclosure may include at least one of an information receiving step (S2110) of receiving vehicle vibration information or vibration request information, a control information determining step (S2120) of determining vibration generation control information about a vibration generation current for generating a vibration having a specific magnitude and a specific phase in a steering motor including a first winding and a second winding based on the vehicle vibration information or the vibration request information, and a vibration generation controlling step (S2130) of performing control such that a vibration generation current is applied to the steering motor based on the vibration generation control information.

In the information receiving step (S2110), vehicle vibration information relating to a vehicle vibration generated in a vehicle or vibration request information requesting generation of a vibration of the steering motor may be received.

The vehicle vibration information may include information about a vibration generated in a steering system including a steering wheel or a steering column. For example, the vehicle vibration information may include information about a magnitude and a phase of a detected vibration based on a detected signal acquired by a sensor that has detected a vehicle vibration.

As one example, the vehicle vibration information may include at least one of vibration magnitude information or vibration phase information acquired by measuring a vibration magnitude and a vibration phase of a vehicle vibration using an acceleration sensor installed inside a vehicle.

The vibration request information may include a detection signal received from a sensor that detects a state of the inside of a vehicle or a road surface state or vehicle state information and road surface information received from another device.

Depending on situations, in the information receiving step (S2110), at least one of vehicle speed information or steering assist information may be received. As one example, in the information receiving step (S2110), vehicle speed information of the vehicle may be received from a vehicle speed sensor. In the information receiving step (S2110), steering assist information used for assisting steering of the vehicle may be received from at least one of a steering torque sensor, a steering angle sensor, or a vehicle speed sensor.

In the control information determining step (S2120), vibration generation control information used for generating a control vibration having a specific magnitude and a specific phase based on the vehicle vibration information or the vibration request information may be received.

As one example, in the control information determining step (S2120), vibration generation control information may be determined based on the vehicle vibration information. Here, the vehicle vibration information may include at least one of vibration magnitude information or vibration phase information about a vehicle vibration.

In such a case, in the control information determining step (S2120), vibration generation control information for generating a control vibration having a magnitude corresponding to the vibration magnitude information may be determined, and vibration generation control information for generating a vibration having a phase opposite to a phase corresponding to the vibration phase information may be determined.

As another example, in the control information determining step (S2120), vibration generation control information may be determined based on table information stored in advance. The table information may include information about at least one or more tables.

As described above, in the control information determining step (S2120), the vibration generation control information may be determined such that a vibration corresponding to a phase opposite to that of the vehicle vibration is able to be generated based on the vibration magnitude information, the vibration phase information, and the table information.

On the other hand, in the control information determining step (S2120), vibration generation control information may be determined based on vibration request information. Here, the vibration request information may include information generated based on at least one of information about an internal state of the vehicle and a road surface state, information about a driver's state, or information about an environment of the vicinity of the vehicle.

Depending on situations, in the control information determining step (S2120), a vehicle speed of the vehicle may be determined based on the vehicle speed information, and, in a case where the vehicle speed is equal to or lower than a reference vehicle speed set in advance, the vibration generation control information may be determined based on the vehicle vibration information.

In the vibration generation controlling step (S2130), a vibration generation current for generating a vibration may be controlled to be applied based on the vibration generation control information.

As one example, in the vibration generation controlling step (S2130), vibration generation control may be performed such that a vibration in a direction perpendicular to a rotation shaft of the steering motor, in other words, a radial direction is generated. In such a case, by performing control such that a current is applied to each of the first winding and the second winding of the steering motor at a vibration period set in advance by repeating on and off, vibration generation control for the radial direction of the motor may be performed.

As one example, in the vibration generation controlling step (S2130), reduction vibration generation control used for generating a vibration for reducing a vehicle vibration may be performed based on the vibration generation control information.

For example, in the vibration generation controlling step (S2130), vibration generation control for generating a vibration having the same magnitude as a magnitude corresponding to the vibration magnitude information and having a phase opposite to a phase corresponding to the vibration phase information may be performed based on the vibration generation control information.

In the vibration generation controlling step (S2130), vibration generation control may be performed based on vibration generation control information determined using table information stored in advance.

As described above, in a case where a vibration having a phase opposite to that of the vehicle vibration is generated, a vehicle vibration can be reduced in accordance with a control vibration generated in vibration generation control based on a destructive interference phenomenon for the two vibrations. In such a case, a degree of reduction of the vehicle vibration may be adjusted by controlling the magnitude of the control vibration.

As another example, the vibration generation controlling step (S2130), haptic vibration generation control for generating a haptic vibration may be performed based on the vibration generation control information.

For example, in the vibration generation controlling step (S2130), it may be determined which of the information about an internal state of the vehicle and a road surface state, the information about a driver's state, or the information about an environment of the vicinity of the vehicle is included in the vibration generation control information and control may be performed such that a vibration generation current for generating a vibration having a different magnitude and a different phase according to the included information is applied.

Through such a process, a control vibration generated in accordance with the vibration generation control is transferred to the steering wheel, and a haptic function can be performed.

On the other hand, in the vibration generation controlling step (S2130), by performing control such that a vibration generation current is applied to the steering motor at a period coinciding with a natural period of one of the steering wheel or the steering column set in advance, a constructive interference is caused to occur, whereby haptic vibration generation control can be performed by using the current mode efficiently.

Depending on situations, in the control information determining step (S2120), a steering assist current may be controlled to be applied to the steering motor based on the steering assist control information or a vibration assist current may be controlled to be applied to the steering motor based on the vibration assist control information.

Figure 22:
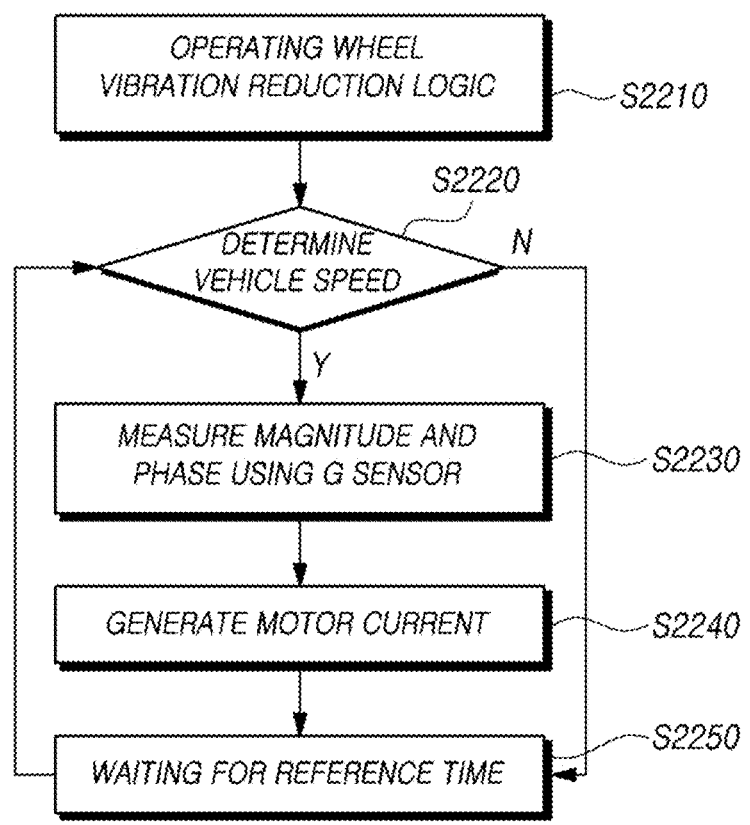
FIG. 22 is a flowchart illustrating a process of reducing a vibration based on a motor control method according to an embodiment.

FIG. 22 is a flowchart illustrating a process of reducing a vibration based on a motor control method according to an embodiment.

Referring to FIG. 22, the motor control method according to an embodiment may include at least one of a wheel vibration reduction logic operating step (S2210), a vehicle speed determining step (S2220), a magnitude and phase measuring step (S2230) using a G sensor, a motor current generating step (S2240), or a reference time waiting step (S2250).

The wheel vibration reduction logic operating step (S2210) may include operating of a wheel vibration reduction logic for reducing a vibration of a steering wheel. In such a case, an operation/non-operation of the wheel vibration reduction logic may be determined based on received vehicle vibration information.

For example, in a case where a magnitude of a steering wheel vibration in vehicle vibration information is determined to be equal to or larger than a reference magnitude set in advance, the wheel vibration reduction logic may be set to be operated.

The vehicle speed determining step (S2220) may include determining of a vehicle speed of the vehicle. As one example, the vehicle speed of the vehicle may be determined based on a detection signal received from a vehicle speed sensor.

In such a case, the vehicle speed determining step (S2220) may include a process of determining whether or not the wheel vibration reduction logic will be continued based on a result of the determination of the vehicle speed based on the reference vehicle speed set in advance.

Generally, in a case where the vehicle stops or the vehicle speed is low, a vibration (0 to 200 Hz) may be generated in an engine. In such a case, a vibration may be generated in a steering column or a steering wheel due to the vibration generated in the engine. Such a vibration may cause a driver's inconvenience. Particularly, in a case where the frequency of a generated vibration coincides with a natural frequency of the steering column, a vibration may be excessively generated.

As described above, a vehicle vibration may lower a steering sense of a driver and give a feeling of fatigue. Thus, in a case where such a vehicle vibration is generated, a configuration for reducing the vibration is necessary.

In consideration of the points described above, in the vehicle speed determining step (S2220), the reference vehicle speed may be set to 10 KPH (Kilometer Per Hour) as an example.

As an example, in a case where the vehicle speed of the vehicle is determined to exceed 10 KPH, a vibration of the steering column or the steering wheel that is generated in accordance with a vibration generated in the engine may not be a problem. Thus, in such a case, the wheel vibration reduction logic ends.

As another example, in a case in which the vehicle speed of the vehicle is determined to be equal to or lower than 10 KPH, the wheel vibration reduction logic may be continued to be performed.

The magnitude and phase measuring step (S2230) using a G sensor may include measuring of a magnitude and a phase of a vibration using the G sensor. Here, the vibration to be measured may include a vibration generated in a steering system mounted inside the vehicle. Particularly, the vibration may include a vibration generated in the steering wheel or the steering column.

The motor current generating step (S2240) may include causing the motor to generate a vibration generation current based on a measured value measured by the G sensor. In such a case, the motor generating a vibration generation current may include a steering motor that is installed in the steering system.

In such a motor current generating step (S2240), the vibration generation current controlled to be generated in the motor may be determined based on a measured value measured by the G sensor. More specifically, a vibration generation current having a tunned magnitude corresponding to the measured value that is measured by the G sensor and an opposite phase may be determined based on a current represented in the measured value that is measured by the G sensor.

In such a case, a vibration generation current having a tunned magnitude corresponding to the measured value measured by the G sensor and the opposite phase may be determined regressively or using a stored lookup table that was tuned in advance in the past. Here, for the regressive determination or the lookup table for determining a vibration generation current corresponding to a vibration magnitude and a phase, which have been measured, any known technology may be used.

In the reference time waiting step (S2250), after end of the motor current generating step (S2240), waiting for a reference time set in advance may be performed. In such a case, the reference time may be determined based on a vibration measured by the G sensor.

More specifically, a vibration period for generating a vibration having a phase opposite to that of the vibration measured by the G sensor in the motor is determined, and a reference time may be set based on the determined vibration period.

As described above, the wheel vibration reduction logic according to an embodiment measures a magnitude and a phase of a vehicle vibration and generates a vibration having a magnitude corresponding to the magnitude of the measured vibration and an opposite phase in the steering motor, and, consequently the vehicle vibration can be reduced.

Figure 23:
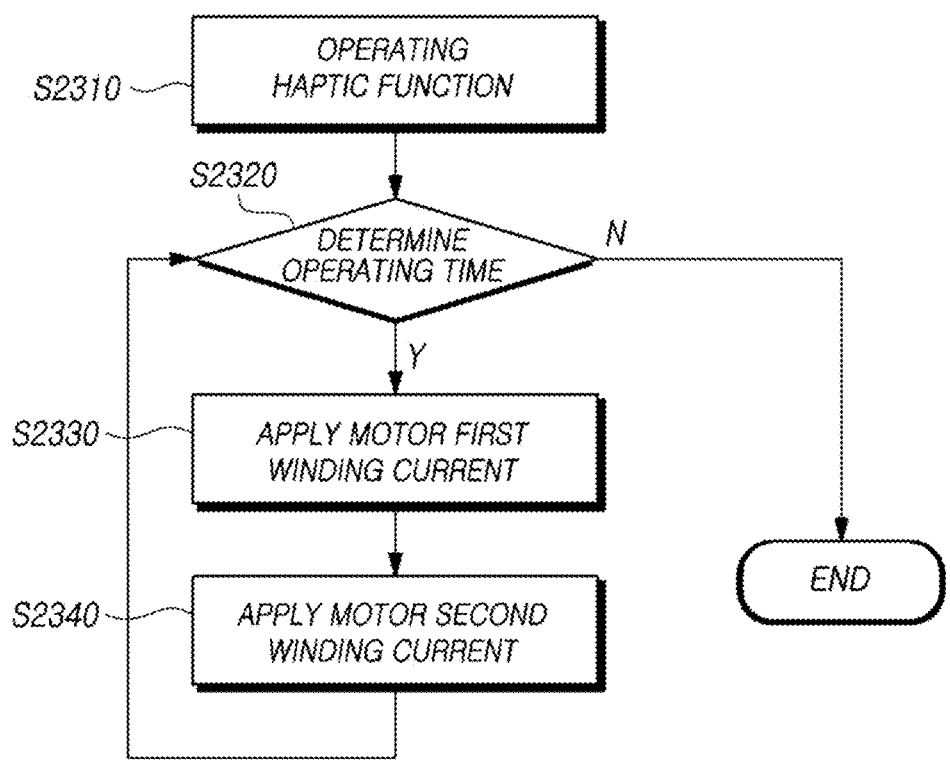
FIG. 23 is a flowchart illustrating a process of generating a haptic vibration based on a motor control method according to an embodiment.

FIG. 23 is a flowchart illustrating an example of a process of generating a haptic vibration based on a motor control method according to an embodiment.

Referring to FIG. 23, a motor control method according to an embodiment may include at least one of a haptic function operating step (S2310), an operating time determining step (S2320), a motor first winding current applying step (S2330), or a motor second winding current applying step (S2340).

The haptic function operating step (S2310) may include causing a haptic function for transferring a haptic signal to a vehicle to be operated. In such a case, it may be determined whether or not the haptic function is operated based on a received haptic signal.

For example, the haptic signal may include signals for which the haptic function is required to be operated in various situations such as a lane keeping signal and a drowsiness prevention signal. For example, the haptic signal may include may include a detection signal received from a sensor that detects a state of the inside of a vehicle or a road surface state or vehicle state information and road surface information received from another device, and the like.

In this way, in the haptic function operating step (S2310), in a case where the haptic function is required to be operated in accordance with reception of a haptic signal or the like, the haptic function may be continued to be performed.

The operating time determining step (S2320) may include determining an operating time of the haptic function. As one example, the operating time of the haptic function may be determined by comparing the operating time with a reference time set in advance.

For example, in a case where the operating time is determined to exceed the reference time, the operation of the haptic function may be ended. On the other hand, in a case where the operating time is determined to be equal to or shorter than the reference time, the operation of the haptic function may be continued to be performed.

By performing such an operation time determining step (S2320), the haptic function can be prevented from continuing to operate over a predetermined reference time.

The motor first winding current applying step (S2330) may include applying of a current to the first winding of the motor. In such a case, the motor to which the current is applied may include a steering motor installed in a steering system.

As one example, the motor first winding current applying step (S2330) may include applying of a current based on a first application time set in advance. In such a case, the first application time may be set to a value determined based on a natural frequency of one of the steering wheel and the steering column.

For example, since the frequency=1/period, a naturel period may be determined based on the natural frequency of one of the steering wheel or the steering column. After that, in a case where a current is applied to the first winding, the first application time may be determined and set such that the period of a vibration generated in the steering motor coincides with the natural period.

The motor second winding current applying step (S2340) may include applying of a current to the second winding of the motor.

As one example, the motor second winding current applying step (S2340) may include applying of a current based on a second application time set in advance. In such a case, the second application time may be set to a value determined based on a natural frequency of one of the steering wheel or the steering column.

For example, after the natural period is determined based on the natural frequency of one of the steering wheel or the steering column, in a case where a current is applied to the second winding, the second application time may be determined and set such that the period of a vibration generated in the steering motor coincides with the natural period.

Then, in the motor first winding current applying step (S2330) and the motor second winding current applying step (S2340), a current may be applied to each of the first winding and the second winding using one ECU. Alternatively, by using a first ECU and a second ECU, the first ECU may apply a current to the first winding, and the second ECU may apply a current to the second winding.

Figure 24:
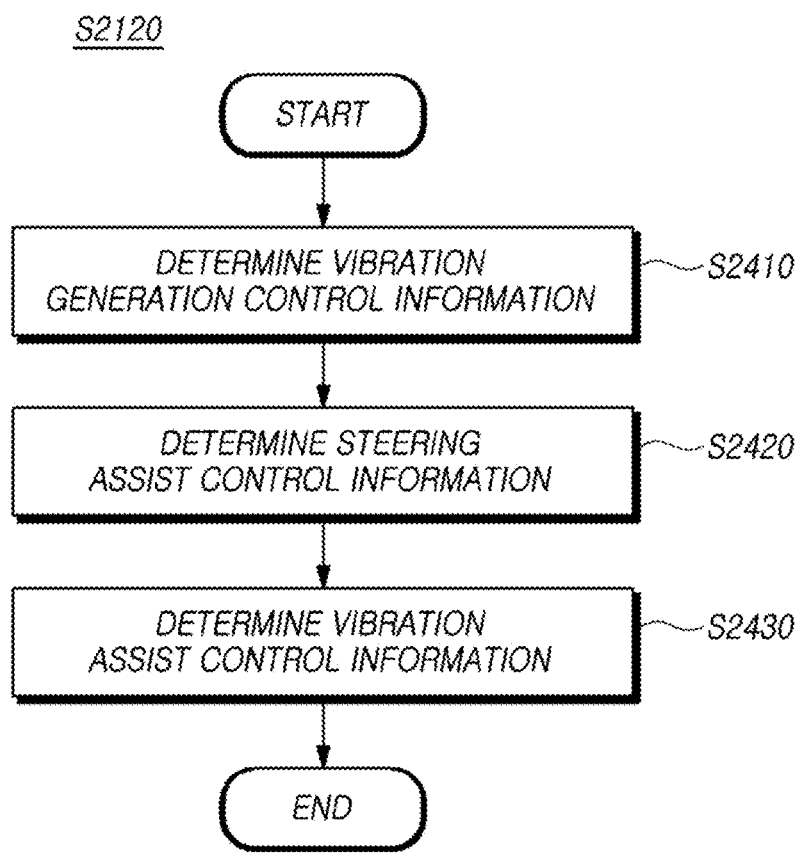
FIG. 24 is a flowchart relating to a control information determining step according to an embodiment.

FIG. 24 is a flowchart relating to a control information determining step according to an embodiment.

Referring to FIG. 24, the control information determining step (S2120) may include at least one of a vibration generation control information determining step (S2410), a steering assist control information determining step (S2420), or a vibration assist control information determining step (S2430).

In the vibration generation control information determining step (S2410), vibration generation control information for generating a control vibration having a specific magnitude and a specific phase may be determined based on vehicle vibration information or vibration request information.

As one example, in the vibration generation control information determining step (S2410), vibration generation control information may be determined based on vehicle vibration information that includes at least one of the vibration magnitude information and the vibration phase information relating to a vehicle vibration. Then, information about a vibration having a phase opposite to that of a vibration retrieved for reducing the vehicle vibration may be determined.

In addition, in the vibration generation control information determining step (S2410), vibration generation control information may be determined based on table information including information about an amount of current to be applied to the steering motor in accordance with values of the vibration magnitude and the vibration phase.

As another example, in the vibration generation control information determining step (S2410), vibration generation control information may be determined based on vibration request information. Here, the vibration request information may include information generated based on at least one of information about an internal state of the vehicle and a road surface state, information about a driver's state, or information about an environment of the vicinity of the vehicle.

In addition, in the vibration generation control information determining step (S2410), vibration generation control information for generating a vibration at a period coinciding with the natural period of one of the steering wheel or the steering column may be determined. In such a case, haptic vibration generation control can be performed using the current more efficiently.

In the steering assist control information determining step (S2420), steering assist control information may be determined based on the steering assist information. Here, the steering assist information may include a detection signal received from a steering torque sensor, a steering angle sensor, a steering angle sensor, a vehicle speed sensor, or the like.

As one example, in the steering assist control information determining step (S2420), information about a steering assist current supplied to the steering motor for steering assist may be determined.

In such a case, in a case where it is determined that steering assist occurs, steering assist control information including a steering assist current may be determined based on the steering assist information received from the steering torque sensor, the steering angle sensor, the vehicle speed sensor, or the like.

In the vibration assist control information determining step (S2430), vibration assist control may be performed based on the vibration assist control information. Here, the vibration assist control information may include control information used for performing each of the steering assist control and the vibration generation control. For example, the vibration assist control information determining step (S2430) may include determining of such a vibration assist current that an amount of the steering assist current is superimposed on the amount of the vibration generation current.

As one example, in the vibration assist control information determining step (S2430), vibration assist control information including details for controlling steering assist not to occur by determining the amount of the steering assist current to be 0 and applying only a vibration generation current to the steering motor may be determined in a case where the steering assist does not occur.

As another example, in the vibration assist control information determining step (S2430), vibration assist control information including details for applying a current acquired by superimposing an amount of the steering assist current on an amount of a vibration generation current in a case where steering assist occurs.

As described above, the present disclosure can provide an apparatus and a method for controlling a motor capable of reducing a vibration generated in a vehicle by performing vibration generation control for a steering motor.

In addition, the present disclosure can provide an apparatus and a method for controlling a motor capable of operating a haptic function by performing vibration generation control for a steering motor.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

REFERENCE SIGNS LIST

100: motor control apparatus
110: receiver
120: determiner
130: controller
200: steering motor
300: steering wheel
400: steering column
310, 410: vehicle vibration before reduction
320: reduction control vibration
420: vehicle vibration after reduction
510: natural frequency band
520: first decrement ratio vibration
530: second decrement ratio vibration
540: third decrement ratio vibration
550: fourth decrement ratio vibration
610, 710: vehicle vibration before haptic generation
620: first haptic control vibration
720: second haptic control vibration
730: haptic constructive vibration
810: first state vehicle vibration
820: first state haptic control vibration
830: first state haptic constructive vibration
910: second state vehicle vibration
920: second state haptic control vibration
930: second state haptic constructive vibration
1010: first current
1020: second current
1110: third current
1120: fourth current
1200: first steering system
1210: first steering motor
1220: first steering wheel
1230: first steering column
1300: second steering system
1310: second steering motor
1320: first steering wheel
1330: second steering column
1400: single wound motor
1410 single winding
1500: dual wound motor
1510: first winding
1520: second winding
1600: single wound motor
1610: single winding
1620: motor rotation direction
1700: dual wound motor
1710: first winding
1720: second winding
1730: motor radial direction
1800: first arrangement structure
1810: first reference axis
1900: second arrangement structure
1910: second reference axis
2000: third arrangement structure
2010: third reference axis

What is claimed is:

1. A motor control apparatus comprising:
a receiver that receives vehicle vibration information or vibration request information;
a determiner that determines vibration generation control information for generating a vibration having a specific magnitude and a specific phase in a steering motor including a first winding and a second winding based on the vehicle vibration information or the vibration request information; and a controller that performs control such that a current is applied to the steering motor based on the vibration generation control information, wherein the vehicle vibration information includes vibration magnitude information and vibration phase information, wherein the determiner determines the vibration generation control information such that a vibration having a phase opposite to the vibration phase information is generated in the steering motor based on the vibration phase information and table information stored in advance.

2. The motor control apparatus according to claim 1, wherein the vehicle vibration information is received from an acceleration sensor provided inside a vehicle.

3. The motor control apparatus according to claim 2,
wherein the receiver further receives vehicle speed information of the vehicle from a vehicle speed sensor, and wherein, in a case where the vehicle speed information is equal to or lower than a reference vehicle speed set in advance, the determiner determines the vibration generation control information based on the vibration magnitude information, the vibration phase information, and the table information.

4. The motor control apparatus according to claim 1, wherein the controller performs control such that the current having a frequency coinciding with a natural frequency of a steering column set in advance is applied to the steering motor if the vibration request information is received.

5. The motor control apparatus according to claim 1
wherein the receiver receives steering assist information for assisting steering of a vehicle from at least one of a steering torque sensor, a steering angle sensor, or a vehicle speed sensor, wherein the determiner determines steering assist control information about a steering assist current supplied to the steering motor based on the steering assist information and determines vibration assist control information about a vibration assist current causing an amount of the steering assist current to be superimposed on an amount of the vibration generation current based on the vibration generation control information and the steering assist control information, and wherein the controller performs control such that the vibration assist current is applied to the steering motor based on the vibration assist control information.

6. The motor control apparatus according to claim 1, wherein the determiner determines the vibration generation control information based on winding weighting information stored in advance such that the vibration generation control information is set different in accordance with a structure in which the first winding and the second winding are arranged in the steering motor.

7. The motor control apparatus according to claim 1, wherein the controller performs control such that a current is applied to each of the first winding and the second winding by repeating on and off at a vibration period set in advance.

8. A motor control method comprising:
receiving vehicle vibration information or vibration request information;

determining vibration generation control information for generating a vibration having a specific magnitude and a specific phase in a steering motor including a first winding and a second winding based on the vehicle vibration information or the vibration request information; and performing control such that a current is applied to the steering motor based on the vibration generation control information, wherein the vehicle vibration information includes vibration magnitude information and vibration phase information, wherein the determining includes determining the vibration generation control information such that a vibration having a phase opposite to the vibration phase information is generated in the steering motor based on the vibration phase information and table information stored in advance.

9. The motor control method according to claim 8, wherein the vehicle vibration information is received from an acceleration sensor provided inside a vehicle.

10. The motor control method according to claim 9,
wherein, in the receiving of vehicle vibration information or vibration request information, vehicle speed information of the vehicle is further received from a vehicle speed sensor, and wherein, in the determining of vibration generation control information, in a case where the vehicle speed information is equal to or lower than a reference vehicle speed set in advance, the vibration generation control information is determined based on the vibration magnitude information, the vibration phase information, and the table information stored.

11. The motor control method according to claim 8, wherein, in the performing of control, control is performed such that the current having a frequency coinciding with a natural frequency of a steering column set in advance is applied to the steering motor if the vibration request information is received.

12. The motor control method according to claim 8,
wherein, in the receiving of vehicle vibration information, steering assist information for assisting steering of a vehicle is received from at least one of a steering torque sensor, a steering angle sensor, or a vehicle speed sensor, wherein, in the determining of vibration generation control information, steering assist control information about a steering assist current supplied to the steering motor is determined based on the steering assist information, and vibration assist control information about a vibration assist current causing an amount of the steering assist current to be superimposed on an amount of the vibration generation current is determined based on the vibration generation control information and the steering assist control information, and wherein, in the performing of control, control is performed such that the vibration assist current is applied to the steering motor based on the vibration assist control information.

13. The motor control method according to claim 8, wherein, in the performing of control, control is performed such that a current is applied to each of the first winding and the second winding by repeating on and off at a vibration period set in advance.

* * * * *